US011461553B1

(12) United States Patent
Adams

(10) Patent No.: US 11,461,553 B1
(45) Date of Patent: Oct. 4, 2022

(54) METHOD AND SYSTEM FOR VERBAL SCALE RECOGNITION USING MACHINE LEARNING

(71) Applicant: Decision Lens Inc., Arlington, VA (US)

(72) Inventor: William James Louis Adams, DeLand, FL (US)

(73) Assignee: Decision Lens, Inc., Arlington, VA (US)

( * ) Notice: Subject to any disclaimer, the term of this patent is extended or adjusted under 35 U.S.C. 154(b) by 154 days.

(21) Appl. No.: 16/600,822

(22) Filed: Oct. 14, 2019

(51) Int. Cl.
| *G06F 40/30* | (2020.01) |
| *G06N 5/04* | (2006.01) |
| *G06N 20/00* | (2019.01) |
| *G06F 40/284* | (2020.01) |

(52) U.S. Cl.
CPC ............ *G06F 40/30* (2020.01); *G06F 40/284* (2020.01); *G06N 5/04* (2013.01); *G06N 20/00* (2019.01)

(58) Field of Classification Search
USPC ............................................... 704/7–10, 257
See application file for complete search history.

(56) References Cited

U.S. PATENT DOCUMENTS

| 8,788,270 | B2 * | 7/2014 | Patel | G10L 25/00 |
| | | | | 704/270.1 |
| 9,146,945 | B2 | 9/2015 | Kumar et al. | |
| 10,120,916 | B2 | 11/2018 | Faruquie et al. | |
| 2003/0233274 | A1 * | 12/2003 | Urken | G06Q 30/02 |
| | | | | 705/12 |
| 2005/0067493 | A1 * | 3/2005 | Urken | G06Q 10/10 |
| | | | | 235/386 |
| 2005/0159994 | A1 | 7/2005 | Huddleston et al. | |
| 2012/0089396 | A1 * | 4/2012 | Patel | G10L 25/00 |
| | | | | 704/249 |
| 2015/0317576 | A1 | 11/2015 | Bonner | |
| 2017/0140007 | A1 | 5/2017 | Agarwal et al. | |
| 2018/0218070 | A1 | 8/2018 | Sharma et al. | |

OTHER PUBLICATIONS

Office Action issued by the U.S. Patent Office dated Jul. 25, 2019 in connection with related U.S. Appl. No. 15/614,788.

(Continued)

*Primary Examiner* — Leonard Saint Cyr
(74) *Attorney, Agent, or Firm* — Posz Law Group, PLC

(57) ABSTRACT

A computer inputs data including different verbal judgment sets. Each different verbal judgment set includes words which are votes that define different rank values and each represents an evaluation of an alternative. The processor determines a word similarity score of each word in the verbal judgment sets to predefined words in a predefined scale. The processor determines a set similarity score between the different verbal judgment set and the predefined scale based on the words included in the different verbal judgment set and the predefined words within the predefined scale. The processor maps the words of the different verbal judgment sets to a numerical scale that corresponds to the predefined scale, based on the set similarity score. The processor interprets the different verbal judgment sets in the universe of known data based on the numerical scale and provides cleansed data which is used by a data-dependent application.

21 Claims, 17 Drawing Sheets

(56) References Cited

OTHER PUBLICATIONS

Final Office Action issued by the U.S. Patent Office dated Mar. 19, 2020 in connection with related U.S. Appl. No. 15/614,788.
Jiri Franek et al., "Judgement scales and consistency measure in AHP." Procedia Economica and Finance 12 (2014) pp. 164-173. Enterprise and the Competitive Environment 2014 conference, ECE 2014, Mar. 6-7, 2014. Brno, Czech Republic.
J.S. Finan et al., "Transitive calibration of the AHP verbal scale." European Journal of Operational Research 112. 1999. pp. 367-372.

* cited by examiner

FIG. 4A

$\mathbb{R}$: The set of all real numbers.

$\mathbb{R}^n$ $n$-dimensional real space.

$\mathbb{I}$: This is the unit interval $[0, 1] \subset \mathbb{R}$.

$\mathbb{S}$: The set of all possible character strings, including spaces, etc. We call this set the string space. Some examples of items in $\mathbb{S}$ are: "high", "medium", "a low vote", "inférieur".

$\mathbb{S}^n$: $n$-dimensional space of strings. It consists of ordered $n$-tuples of elements of $\mathbb{S}$.

$\mathbb{S}^\infty$: The union of all $\mathbb{S}^n$ for $n = 1, 2, \ldots$, i.e.

$$\mathbb{S}^\infty \triangleq \bigcup_{n=1}^{\infty} \mathbb{S}^n$$

$\mathbb{I}^\infty$: The union of all $\mathbb{I}^n$ for $n = 1, 2, \ldots$, i.e.

$$\mathbb{I}^\infty \triangleq \bigcup_{n=1}^{\infty} \mathbb{I}^n$$

FIG. 4B

Categorical scale: An ordered list of unique elements of S. These elements are called the levels of the scale. For instance $C = ($'hi', 'med', 'lo'$)$ is a categorical scale whose levels are 'hi', 'med', and 'lo'. Another way of defining a categorical scale is $C \in S^n$ is a categorical scale iff its components are all different.

$|C|$: If $C$ is a categorical scale, $|C|$ is the order of $C$ and is defined to be the number of levels in the scale.

$\#(C)$: If $C$ is a categorical scale, and $C = (c_1, \ldots, c_n)$ then $\#(C)$ is the default numerical scale of $C$ and is defined to be:

$$\#(C) = \begin{cases} (1) & \text{if } n = 1 \\ \left(1, \frac{n-2}{n-1}, \frac{n-3}{n-1}, \ldots, \frac{2}{n-1}, \frac{1}{n-1}, 0\right) & \text{otherwise} \end{cases}$$

$\operatorname*{argmax}_{a \in A} \{f(a)\}$: If $f : A \to \mathbb{R}$ is a real valued function, the argmax of $f$ over $A$ is the value of $a \in A$ that results in the maximum value of $f(a)$. If there are multiple values of $a \in A$ that result in the same maximum value, we choose one. A standard method of resolving ties is to order $A = (a_1, a_2, \ldots)$ and chose the item with the lowest index.

FIG. 5A

Goal 1. Defining a numerical interpretation for any list of categorical votes means we wish to define a function $\mathbb{S}^\infty \to \mathbb{I}^\infty$

FIG. 5B

Problem 1. Our approach to this problem consists of two main pieces, one depending upon the other:

1. Define a collection of <u>predefined scales</u>, which we denote by:

$$\vec{\mathcal{C}} = (\mathcal{C}_1, \ldots \mathcal{C}_n)$$

2. Define a function $\mathcal{F} : \mathbb{S}^\infty \to \vec{\mathcal{C}}$ that associates to any list of votes $\vec{v} \in \mathbb{S}^\infty$:

(a) a predefined scale $\mathcal{F}(\vec{v})$ (b) and a mapping of the elements of $\vec{v}$ to the levels in the scale $\mathcal{F}(\vec{v})$.

(c) and a confidence score (a number between 0 and 1) for that mapping of the votes $\vec{v}$ to the predefined scale $\mathcal{F}(\vec{v})$.

FIG. 5C

Note 1. *That confidence score is really a mapping $\mathfrak{f} : \mathbb{S}^\infty \to \mathbb{I}$ that associates to any list of votes $\vec{v}$ the confidence $\mathfrak{f}(\vec{v})$ that the predefined scale $\mathcal{F}(\vec{v})$ is a good match to the votes $\vec{v}$.*

FIG. 6

Problem 2 (Sentiment analysis approach). Define a mapping $Q : \mathbb{S} \to I$ that gives the numerical value of any word. We use that mapping to create our desired mapping $\mathbb{S}^\infty \to I^\infty$ that scores any list of categorical votes.

FIG. 7

Problem 3 (kNN usage). Given to words $w_1, w_2 \in \mathbb{S}$ calculate a similarity score for those words. The similarity score should be a real number between 0 and 1, where 0 means completely dissimilar and 1 means identical. In function notation, we wish to define a function:

$$\text{sim} : \mathbb{S} \times \mathbb{S} \to \mathbb{I}.$$

FIG. 8

Note 2. *In Table 3 we need only define the $f_1, \ldots, f_m$ word pair features and the training data set $\vec{w}_1, \ldots, \vec{w}_N$. The remainder is the standard kNN algorithm applied to that data.*

FIG. 9

TABLE 1: TECHNICAL DETAILS OF STEPS

1. Create a function: $\text{sim} : \mathbb{S} \times \mathbb{S} \to \mathbb{I}$ that inputs pairs of strings and outputs their "similarity score", i.e. a score between 0 (meaning completely dissimilar) to 1 (meaning completely similar). (This is the difficult part of the process.)

2. Given a predefined scale $\mathcal{C} = (c_1, \ldots, c_k)$:

(a) For each vote $v_i \in \vec{v}$ calculate how well $v_i$ matches the scale $\mathcal{C}$ by calculating:

$$\overline{\text{sim}}(v_i, \mathcal{C}) = \text{similarity of } v_i \text{ to } \mathcal{C} \triangleq \max_{j=1,\ldots,k} \{\text{sim}(v_i, c_j)\}$$

In other words, we find the best matching word in $\mathcal{C}$ to match the word $v_i$, and call that score the similarity score of $v_i$ to $\mathcal{C}$.

3. The previous step gives us a list of $n$ similarity scores for $\vec{v} = (v_1, \ldots, v_n)$ to the predefined scale $\mathcal{C}$. We combine those scores together using an $L^p$ norm, normally denoted by $\|\cdot\|_p$ and defined to be:

$$\|(x_1, \ldots, x_m)\|_p \triangleq \sqrt[p]{\sum_{i=1}^{m} |x_i|^p}$$

And we define our $p$-similarity of $\vec{v}$ to $\mathcal{C}$ to be:

$$\widehat{\text{sim}}_p(\vec{v}, \mathcal{C}) \triangleq \| (\overline{\text{sim}}(v_1, \mathcal{C}), \ldots, \overline{\text{sim}}(v_n, \mathcal{C})) \|_p$$

4. Lastly we look across all predefined scales $\mathcal{C}_i$ to find the one with the largest $p$-similarity score and define that to be the best match, and that score to be the matching score.

FIG. 10

TABLE 3: WORD PAIR SIMILARITY SCORE WITH KNN

1. Define simple to calculate word pair similarity scores, aka features in machine learning parlance. We call those $f_1, \ldots, f_m$ that are maps $S^2 \to \mathbb{I}$.

2. Have a training set of word pairs $\vec{w}_1, \ldots, \vec{w}_N \in S^2$ that each have a similarity score $s_1, \ldots, s_N$.

3. Then we have a table of data like the following:

|  | training similarity score | $f_1$ | $\ldots$ | $f_m$ |
|---|---|---|---|---|
| $\vec{w}_1$ | $s_1$ | $f_1(\vec{w}_1)$ | $\ldots$ | $f_m(\vec{w}_1)$ |
| $\vec{w}_2$ | $s_2$ | $f_1(\vec{w}_2)$ | $\ldots$ | $f_m(\vec{w}_2)$ |
| $\vdots$ | $\vdots$ | $\vdots$ | $\ddots$ | $\vdots$ |
| $\vec{w}_N$ | $s_N$ | $f_1(\vec{w}_N)$ | $\ldots$ | $f_m(\vec{w}_N)$ |

4. We train a kNN algorithm against this data

5. We use $k = 5$ as the default value, but this value may change in future versions of the algorithm.

6. We use the standard Euclidean distance for kNN, but this may change in future versions of the algorithm.

7. The training data $\vec{w}_i$ is stored in the file:

FIG. 11

Note 4 (Vote versus level in $S^2$). *Our features are functions $S^2 \to \mathbb{I}$. The first coordinate we call the <u>vote</u> and the second coordinate we call the <u>level</u>. For our application a vote is one element of a list of votes we are comparing to predefined scales. Whereas the level is a single element in a predefined scale. In other words, when we use these functions, we put the vote in the first coordinate and the level of the predefined scale we are testing against in the second coordinate.*

FIG. 12A

Definition 1 (sim function). We use kNN with regression on the training data, using the features $f_1, \ldots, f_5$ defined previously to define our <u>ML word pair similarity score function</u>, which we denote by $\text{sim} : S^2 \to \mathbb{I}$.

FIG. 12B

We calculate step 2, the word to predefined scale similarity by the following formula:

$$\text{sim}'(v, C) = \text{vote } v \text{ to scale } C \text{ similarity} = \max_{c_i \in C}(\text{sim}(v, c_i))$$

FIG. 13

Definition 2 (Votes to scale similarity vector: $\vec{\text{sim}}$). Given $\vec{v} = (v_1, \ldots, v_m)$ a vector of votes and a predefined scale $C$, we define the votes to similarity vector to be:

$$\vec{\text{sim}}(\vec{v}, C) \triangleq (\text{sim}'(v_1, C), \ldots, \text{sim}'(v_m, C))$$

FIG. 14

TABLE 4: $L^p$-TOKENIZATION

1. Normalizes the vote and level strings

2. Tokenize on space characters

3. Breaks the vote string up into tokens $v_1, \ldots, v_n$ and tokenizes the level string into tokens $\ell_1, \ldots, \ell_q$ 4. For $i = 1, \ldots, n$ (we loop over vote tokens), and let $\vec{\ell}$ be the level tokens.

(a) Find the $\ell_j \in \vec{\ell}$ with the maximum string similarity score to $v_i$ (for this string similarity feature we are defining, i.e. it is recursive).

(b) Call that $\ell_j$ the best match for $v_i$ and record that score in the vector $\vec{s}$.

(c) Remove $\ell_j$ from $\vec{\ell}$ so that we do not match the same level token to multiple vote tokens.

(d) Break if the length of $\vec{\ell}$ is zero.

5. Take the $L^p$ norm of $\vec{s}$ (which is length $m = \min(n, q)$) and divide by the $L^p$ norm of $\vec{1_m} = (1, \ldots, 1)$ $m$-times. In other words:

$$\frac{\|\vec{s}\|_p}{\|\vec{1_m}\|_p}$$

FIG. 15

Definition 3 (Vote matches a scale). Given a number $\alpha \in \mathbb{I}$ and a vote $v_i$ we say that $v_i$ matches a scale $\mathcal{C}$ to level $\alpha$ iff $\text{sim}'(v_i, \mathcal{C}) \geq \alpha$.

FIG. 16

Definition 4 (Votes $\to$ scale similarity score $\overline{\text{sim}}$). Let $\alpha \in \mathbb{I}$ and $p$ be a positive real number. We calculate the $p$-similarity score for a vector of votes $\vec{v}$ to a predefined scale $\mathcal{C}$ by calculating several statistical measurements on $\vec{\text{sim}}(\vec{v}, \mathcal{C})$. Those statistical measurements are:

- The mean of the vector $\vec{\text{sim}}(\vec{v}, \mathcal{C})$, which we denote by $m$.

- The mean of the elements of the vector $\vec{\text{sim}}(\vec{v}, \mathcal{C})$ that match the scale to level $\alpha$. We denote this by $m'$.

- The percent of votes that matched to level $\alpha$. We denote this by $p_v$.

- The percent of levels of $\mathcal{C}$ that are used. We denote this by $p_c$.

We then calculate the weighted $L^p$ norm of those statistical measurements, i.e.

$$\overline{\text{sim}}(\vec{v}, \mathcal{C}) \triangleq \frac{\sqrt[p]{(w_1 m)^p + (w_2 m')^p + (w_3 p_v)^p + (w_4 p_c)^p}}{\sqrt[p]{w_1^p + w_2^p + w_3^p + w_4^p}}$$

Note: since $\overline{\text{sim}}$ has parameters $p$, $\alpha$, and the weights $\vec{w} = (w_1, w_2, w_3, w_4)$ we should really use the notation:

$$\overline{\text{sim}}_{\alpha, p, \vec{w}}(\vec{v}, \mathcal{C})$$

However, when those parameters are clear from context we can suppress them in the notation.

FIG. 17

Definition 5 (Best predefined scale matching $\vec{v}$). Given a list of predefined scales $\vec{\mathcal{C}} = (\mathcal{C}_1, \ldots, \mathcal{C}_\varphi)$ and a vector of votes $\vec{v}$ the best match score of $\vec{v}$ to $\vec{\mathcal{C}}$ is defined to be:

$$\text{match}_{\alpha,p,\vec{w}}(\vec{v}, \vec{\mathcal{C}}) \triangleq \max \left\{ \overline{\text{sim}}_{\alpha,p,\vec{w}}(\vec{v}, \mathcal{C}_1), \ldots, \overline{\text{sim}}_{\alpha,p,\vec{w}}(\vec{v}, \mathcal{C}_\varphi) \right\}$$

where $\alpha, p, \vec{w}$ are as Definition 4. We define the $\beta$-level best matching scale to $\vec{v}$ to be:

$$\text{match}_{\alpha,p,\vec{w}}(\vec{v}, \vec{\mathcal{C}}) \triangleq \begin{cases} \emptyset & \text{if } \text{match}_{\alpha,p,\vec{w}}(\vec{v}, \vec{\mathcal{C}}) < \beta \\ \underset{\mathcal{C}_i \in \vec{\mathcal{C}}}{\arg\max} \left\{ \overline{\text{sim}}_{\alpha,p,\vec{w}}(\vec{v}, \mathcal{C}_i) \right\} & \text{otherwise} \end{cases}$$

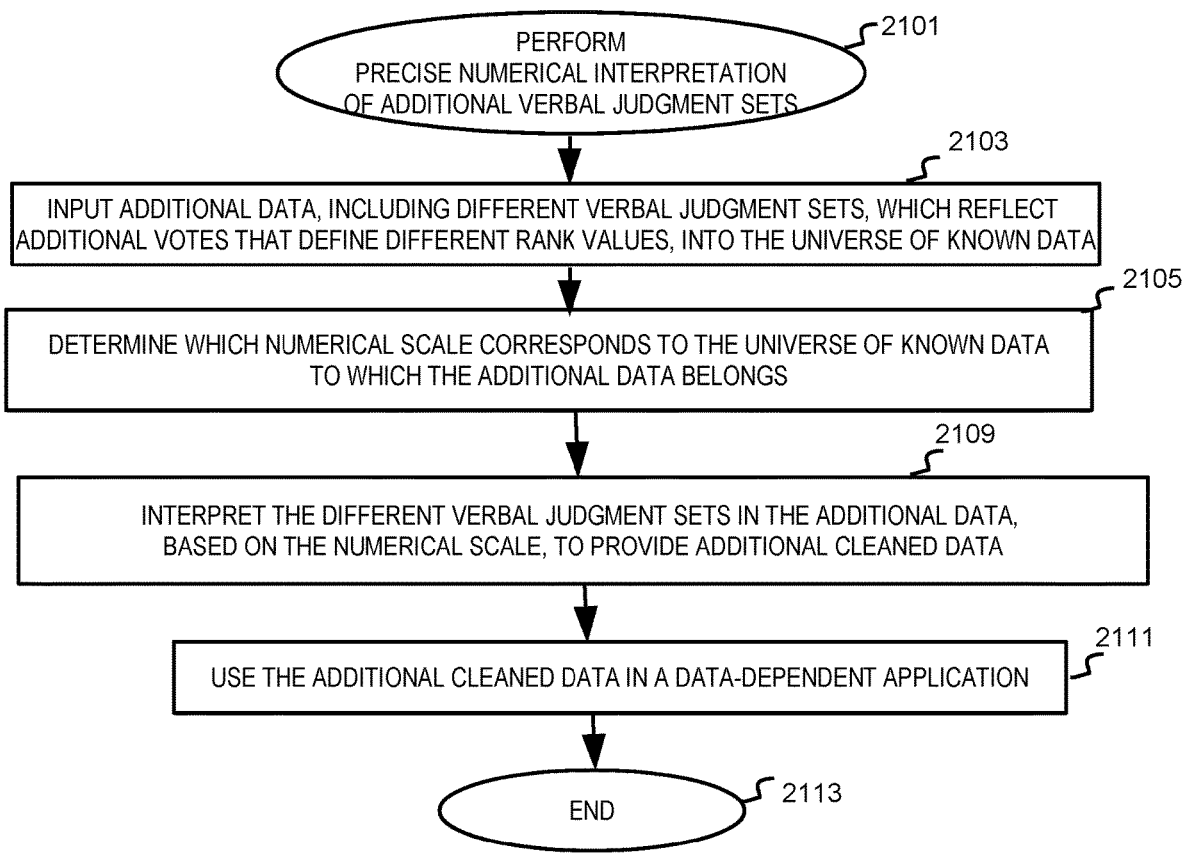

METHOD AND SYSTEM FOR VERBAL SCALE RECOGNITION USING MACHINE LEARNING

TECHNICAL FIELD

The technical field relates in general to systems and methods for cleaning and/or transforming data which may be used, by way of example, for decision making software.

BACKGROUND

Companies and people have data everywhere. Companies store and utilize data, which is in (for example) databases, data centers and the cloud. As the volume of data and the value of such data continues to increase, companies search for ways to utilize even more data, in ways which allow users to understand the data. However, data has varying degrees of health and although individually the data may reflect information, the data might not be usable as part of a very large dataset where all of the data is expected to relate to each other. Most data is "dirty" (inaccurate, incomplete, or inconsistent) and not ready for presentation or use merely after being acquired and stored.

Companies need to be sure their data is clean and high quality before it is used. Existing data may have varying levels of quality. The quality problem grows exponentially with the amount of data to be processed.

Computer software exists for helping users to choose from and/or rate alternatives, using for example pairwise comparison, sensitivity analysis, or others. Such software utilizes large amounts of data which should be consistent throughout. Decision making software is available from Decision Lens and may utilize AHP (analytic hierarchy process) and ANP (analytic network process); SuperDecisions software is available from The Creative Decisions Foundation. These are based on multi criteria decision making methods. Other examples include Criterium DecisionPlus brand software, Intelligent Decision System brand software, Ahoona brand networking software, and others. These all can perform complex analyses on the data so as to make decisions.

There are numerous practical applications of decision making software, many of them involve complex decisions. Data supporting the decisions may be based on large numbers of decisions by many users regarding merits of compared choices. For example, athletic scouts and sports teams have custom data for rating sales. As another example, stocks may be rated periodically with verbal scales. In some cases, the data is based on pairwise comparisons, or votes. In some cases, the decisions are made regarding benefits, opportunities, costs, and risks of alternatives (BOCR).

Conventional software can force a user to utilize numeric values directly or pre-defined words to describe the decisions as to relative merits. Pre-defined words and numeric values forced on a user can be time consuming, disruptive, and confusing, and moreover feel arbitrary to the user. Moreover, different users may prefer different words to describe votes as to relative merits of the same alternatives. Conventional software which attempts to use data derived from votes using voter selected words will provide wildly inaccurate outcomes.

Verbal scales are commonly used in questionnaires which involve responses by users. One conventional, widely used technique is a Likert scale, which may emerge from collective responses to a set of items. A scale may be created based on the answers (for which options are predefined) over the set of individual items. Likert scaling assumes distances between each answer are equal, whereas a user's intensity of agreement may not actually be equal and the Likert scale may seem to be arbitrary.

Inconsistent data may lead to incorrect conclusions and may be costly. High quality data has qualities which include, among other things, Accuracy, Completeness, Consistency and Uniformity. Accuracy reflects that the data conforms to a true, correct value. Completeness reflects that the required measures are all known; completeness is difficult to achieve through data cleansing since facts which were not captured cannot be inferred; enhancing the data by supplying a default value for missing data does not mean that the data is complete. Consistency is a degree to which a set of measures are equivalent across data; if two data items contradict each other they are "inconsistent"; inconsistency cannot always be fixed because a determination must be made to decide which contradictory data item is correct, such as using the most recent, or using the most reliable data source. Uniformity means that the measurements in the set of data use the same units of measure. Much effort has been expended in attempt to find efficient data cleansing tools which address these and other problems of data in general. Data cleansing tools are commercially available which attempt to fix dirty data offered under trademarks such as Trifacta, Alteryx, Data Ladder, Optimus (distributed by Apache), and others.

Verbal scales provided by individuals are inherently prone to be inaccurate, incomplete, inconsistent, and not uniform, whether among a single user's responses to a set of items, and/or among the collective responses of multiple users to the same set of items. Users tend to not be consistent in the words used to evaluate items, especially if users are not limited to pre-defined words. Also, verbal scales tend be inconsistent among multiple users; one user might use High, Hi, H, Medium, Med, M, Low, Lo and L as interchangeable to indicate High, Medium, and Low; another user might say Good, G, Bad, B, Okay and OK interchangeably to indicate the same concepts High, Low and Medium. Data cleansing is time consuming and difficult on verbal scales provided by individuals for various reasons. For example, a verified true, correct value might not be available to confirm the data which is provided; data which is provided is inconsistent; data may be prone to typographical errors; data might be incomplete but appear to be complete; and users may use different units of measure.

Because technology and data handling needs and requirements vary between different data-dependent applications, data handling systems may also vary regarding what data is handled, how the data is handled, how much data is processed, stored, or communicated, and how quickly and efficiently the data may be processed, stored, or communicated. The variations in data handling systems allow for data handling systems to be general or for a specific use such as decision making, financial transaction processing, project management, enterprise data storage, or global communications. In addition, data handling systems may include a variety of hardware and software components that may be configured to process, store, and communicate data and may include one or more computer systems, data storage systems, and networking systems.

A system that collects data must be tolerant of errors and transform the erroneous data into useful data that can be processed. An example system that uses such data is Decision Lens' AHP system which uses rating scales. Other software systems may have data which might not be forced into a standard system. There remains a need for a tool which provides improved cleansing of data. There is furthermore a need for a tool which can support a system that collects and utilizes verbal scale data by appropriately cleaning the data as to one or more of Accuracy, Completeness, Consistency and/or Uniformity. In addition, there is a strong need for such a tool to prepare data for multiple criteria decision making systems.

SUMMARY

Accordingly, one or more embodiments provide a method, system, and/or a non-transitory computer readable storage medium for precise numerical interpretation of different verbal judgment sets. The method can be for recognizing a numerical scale as a precise numerical interpretation of a plurality of different verbal judgment sets. The method can include inputting data including the plurality of different verbal judgment sets, wherein each of the different verbal judgment sets includes words which are votes that define different rank values within one of the different verbal judgment sets, wherein a rank value represents an evaluation of an alternative.

The method can also include, for the words in the different verbal judgment sets: determining a word similarity score of the word in the one of the different verbal judgment sets to predefined words in at least one predefined scale of a universe of predefined scales.

The method can also include, for the different verbal judgment sets: determining a set similarity score between the one of the different verbal judgment sets and the at least one predefined scale based on the words included in the one of the different verbal judgment sets and the predefined words within the at least one predefined scale.

The method can also include mapping the words of the one of the different verbal judgment sets to a numerical scale that corresponds to the at least one predefined scale of the universe of predefined scales, based on the set similarity score to the at least one predefined scale; and interpreting the different verbal judgment sets in a universe of known data based on the numerical scale.

In one or more embodiments, the method includes determining an implied rank value within the one of the different verbal judgment sets; and adjusting the numerical scale based on the one of the different verbal judgment sets including the implied rank value.

In one or more embodiments, the method includes receiving additional data including the different verbal judgment sets, determining a respective matching score between the at least one predefined scale and the different verbal judgment sets in the additional data, and when a perfect matching score is determined, updating the numerical scale based on the predefined scale and the different verbal judgment sets with the perfect matching score.

In one or more embodiments, the method includes generating a confidence score that indicates how the different verbal judgment sets match the numerical scale.

In one or more embodiments, the input data is based on actual votes in a decision system, wherein the actual votes are interpreted using the numerical scale.

In one or more embodiments, the method includes inferring a missing step as an additional rank value into the one of the different verbal judgment sets. In an embodiment, the missing step is an additional rank value that is internal in the one of the different verbal judgment sets. For example, the step "medium" is an internal step internal to the list of ("high", "low") and can be inferred according to one or more embodiments.

In one or more embodiments, the method includes inferring a missing concept as an additional rank value into the one of the different verbal judgment sets. In an embodiment, the missing concept is a value of degree to the verbal judgment sets. For example, the value "very" as in "very" high may be inferred from the existence of "very low" in a list. That is, a missing concept may be added to symmetrically balance an existing concept in a list.

It should be noted that also disclosed herein are a system and non-transitory, computer-readable storage medium featuring the functionality described above.

One, or a combination of more than one, or all, of the above embodiments, can be combined and provided as a single embodiment.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 4A illustrates example terminology in this disclosure.

FIG. 4B defines a categorical scale.

FIG. 5A illustrates Goal 1 regarding a numerical interpretation of any list of categorical votes.

FIG. 5B illustrates Problem 1 regarding an approach to solving the problem.

FIG. 5C illustrates Note 1 regarding the confidence score.

FIG. 6 illustrates Problem 2 regarding a sentiment analysis approach.

FIG. 7 illustrates Problem 3 regarding usage of a machine learning method to determine similarity.

FIG. 8 illustrates Note 2 regarding definition of word pair features and training data.

FIG. 9 illustrates Table 1: Technical Details of Steps.

FIG. 10 illustrates Table 3: Word Pair Similarity Score with kNN (example machine learning).

FIG. 11 illustrates Note 4 regarding vote versus level as an aspect of similarity.

FIG. 12A illustrates Definition 1 regarding a machine learning similarity function.

FIG. 12B illustrates using a word pair similarity function of Definition 1 of FIG. 12 to create a votes to predefined scale similarity function.

FIG. 13 illustrates Definition 2 regarding votes to scale similarity vector.

FIG. 14 illustrate Table 4: $L^P$-Tokenization.

FIG. 15 illustrates Definition 3 (vote matches a scale).

FIG. 16 illustrates Definition 4 (votes 4 scale similarity score).

FIG. 17 illustrates Definition 5 (best predefined scale matching vector of votes).

FIG. 21 is a flow chart illustrating a procedure to perform precise numerical interpretation of additional different verbal judgment sets.

DETAILED DESCRIPTION

Figure 1:
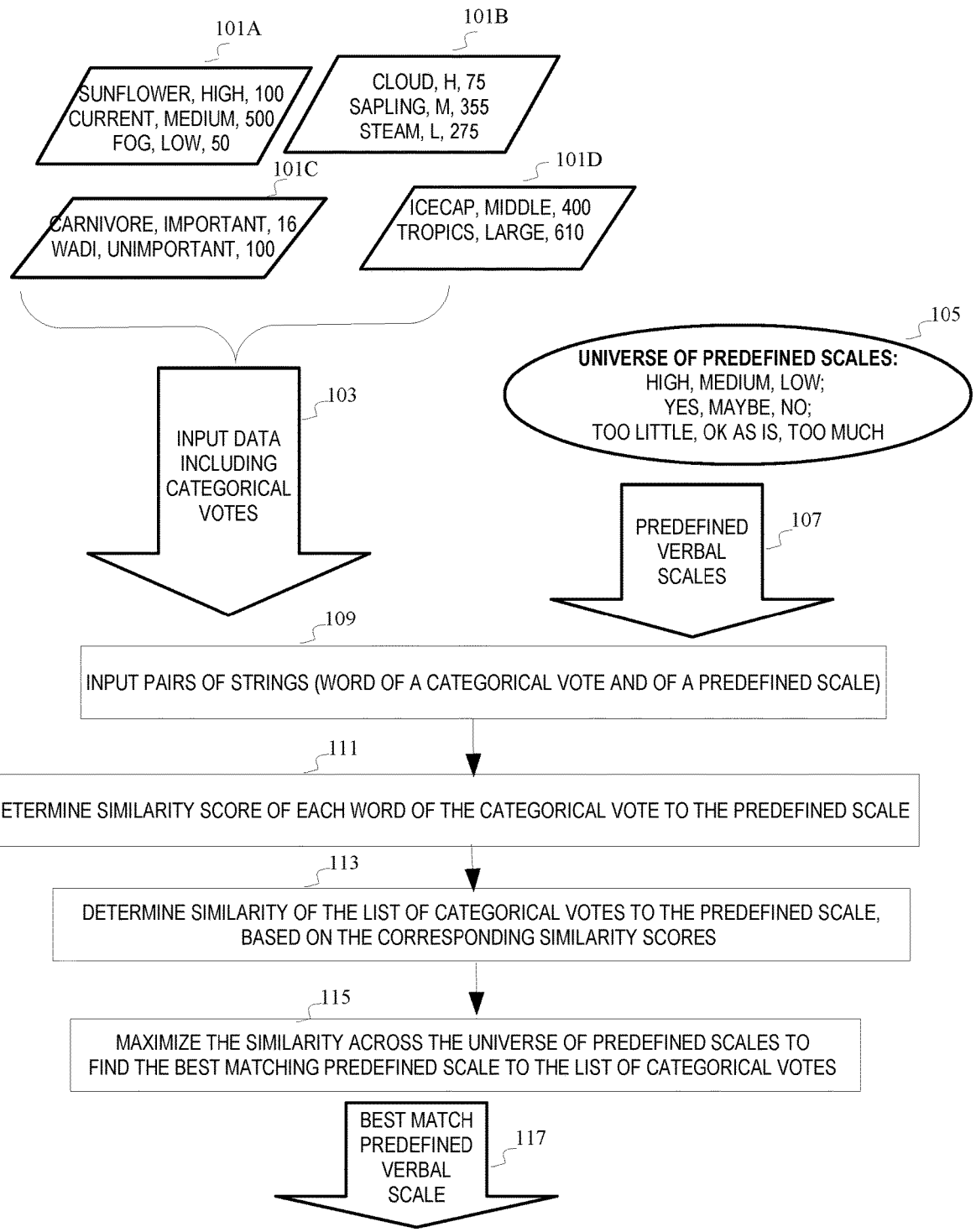
FIG. 1 is a flow diagram illustrating verbal scale recognition.

In overview, the present disclosure concerns cleaning data. More particularly, various inventive concepts and principles are embodiments in systems, devices, and methods therein for cleaning data in a specialized manner so as to obtain useful information, especially to recognize a numerical scale as a precise numerical interpretation of different verbal judgment sets.

As further discussed herein below, various inventive principles and combinations thereof are advantageously employed to quickly and efficiently clean and transform data, which is different verbal judgment sets, or votes, which may be provided as large data sets and/or inconsistent data sets, into high quality data usable by data-dependent applications such as multi criteria decision making software and others.

Further in accordance with exemplary embodiments, data is cleaned and transformed into useful information. The transformed data need not replace the input data. The different verbal judgment sets may be interpreted as they exist based on mapping the words to a numerical scale that corresponds to a predefined scale in the universe of predefined scales. Such an approach is adaptable as additional verbal judgment sets are added to the universe of known data.

1.0 Introduction and Overview

This discussion begins with an overview of the concepts covered herein. The details are revealed in subsequent sections of this document. Much of the discussion involves definitions, sets and algorithms, which are discussed with great precision using special notation which patent specification printing limitations do not accurately reproduce when printed. As an example, the well understood notation "R" which indicates the set of all real numbers does not print properly in a specification. To allow accurate reproduction of special notation, and for complete understanding, the specification refers to figures which include terminology, definitions, problems, notes, and technical details of steps.

Consider that most companies have very large amounts of existing data, which needs to be converted into numerical data so that the data may be used. Without the conversion, the data will provide incorrect results. To be able to run an application on existing data, the existing data may be imported so that it may be used for any of various multi criteria data analysis, such as a known monte carlo analysis, a known project analysis, or the like.

Typically, the initial input will be verbal measurements. The verbal measurements must be converted into a numerical score. Even under the most ideal circumstances this is difficult because people use different words and spellings. Consequently, data must be both cleaned (of inconsistencies, for example) and transformed (into numerical data).

Furthermore, once a system is in place to utilize cleaned and transformed data, the users of the system should still be able to add more data. A typical system may attempt to utilize various ways to limit errors in data, such as auto complete, or menus, which reduce or prevent manual typing, and therefore have less chance for error. But every time a system is to analyze the data it preferably should be cleansed because errors cannot be prevented.

Many of these multi criteria data analysis systems merely take the data as presented; these systems do not have control over the data which is obtained. "Dirty" data provided to the analysis system provides poor results, if any results are provided.

The system described herein inputs data, which is typically provided by another application, some of which were discussed herein and may include spreadsheets, data networks, or databases. The data can be obtained from the spreadsheet, data network, or database in accordance with known techniques. The problem is cleaning the data and transforming the data into useful information. Preferably the transformed data does not replace the input data, but is handled separately.

Consider a practical example. Shared spreadsheets are collaborative; different users put in data. The present system can clean up the data in the spreadsheet, and then a user inputs the cleaned data into a particular application.

The present system is tolerant of errors and transforms data with errors into data that can be processed.

As an example, consider Decision Lens AHP system which relies on rating scales; users may have existing data not ready for use in the Decision Lens AHP system, and that existing data may not be forced into a standard system such as the Decision Lens AHP system. Consider that a rating of "hi" in an existing system: on a 1.0 scale, does a rating of "hi" mean 0.9? or 0.92? There are numerous other existing customer specific databases which utilize data, in addition to the standard hi-med-lo.

Techniques are known for using stemming, to determine words which are equivalent based on a stem in the words. For example, "highly" and "higher" have the stem "high" and may be treated as equivalent to "high".

Techniques are known for using synonyms, via synonym searches (known). For example, "high" and "good" may be treated as equivalent based on a synonym search. A direct synonym technique is an existing technique for handling data cleansing of such data. With this conventional technique, a list of words are matched to a previously known list.

As another example, a standard sentiment analysis would determine that a list of words lo, med, hi, are equally spaced. Nevertheless, the assumption that the words are equally spaced is not necessarily correct. We want to know the gradation, between low and medium, and medium and high. As a concrete example, consider a list of "very lo", "low" and "h": the gap from "very lo" to "low" is likely very different from the gap from "low" to "high" (utilizing a determination that "h" means "high" and that "medium" is missing). But "h" could mean "hi" or it could mean "horrible" depending on the user. Therefore, forcing the cleansed data in the list of "very lo", "low" and "h" to match "lo", "med" and "hi" is likely incorrect.

Moreover, the scales and ranking provided in the "dirty" data, are translated into numerical systems, because numerical data is more precise and more easily analyzed.

It is common for users to have verbally defined levels of data, for instance, 'High risk', 'Medium risk', 'Low risk'.

This data needs to be converted to numerical data for analysis. The standard methodology is to force users to define the numeric values directly. This is time consuming, disruptive, and confusing (what numerical value should they associate with each level, it feels arbitrary). In this work we define an algorithm that inputs verbal votes and outputs, e.g., the numerical values. In addition the algorithm can output a standardized verbal version for those votes, and has some knowledge of the confidence level of the prediction, allowing us to 'fail' nicely when we are not sufficiently confident in the numeric prediction. The algorithm may utilize a machine learning algorithm, such as the kNN (k-nearest neighbors) machine learning algorithm.

Decision software may be driven by columns of data that categorize and score projects against various dimensions. Decision software may be more particularly decision analysis software using multiple-criteria decision analysis based on multiple criteria data. That data is usually either numeric (e.g., Revenue in dollars) or categorical (e.g. Region N/S/E/W). However, there is another common data type, categorical data that has a numerical interpretation, for example votes of High, Medium, Low on a column called "Value". Those categories may have numerical values of 1, 1/2, and 0 respectively. (There are, of course, other possible numerical interpretations of the level High, Medium, Low. However the values of 1, 1/2, 0 can be thought of as the canonical or default interpretations of those votes.) In this document we discuss an algorithm that converts such categorical data into numerical data. That numerical interpretation can then be used by the algorithms of software which relies on numerical data, for example, decision software, to grade portfolios of projects, calculate impact scores, calculate the effect of groups of alternatives which have been voted on, or the like. It may be noted that "alternative" is a term of art in the field of AHP and should not be broadly interpreted.

Figure 2:
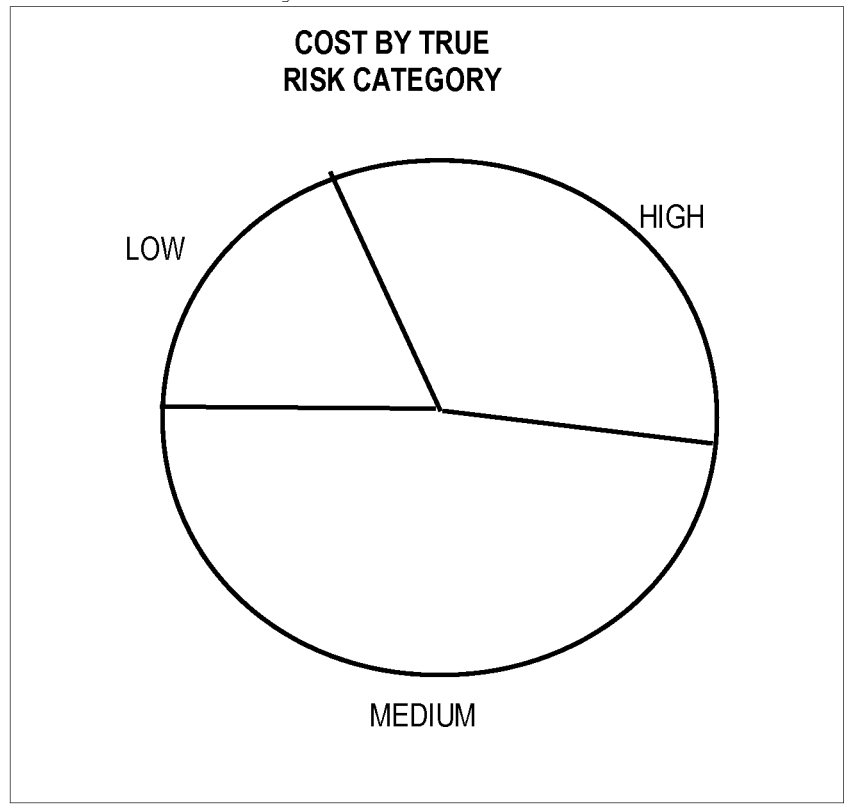
FIG. 2 is a flow diagram illustrating an application of the verbal scale recognition of FIG. 1.
Figure 3:
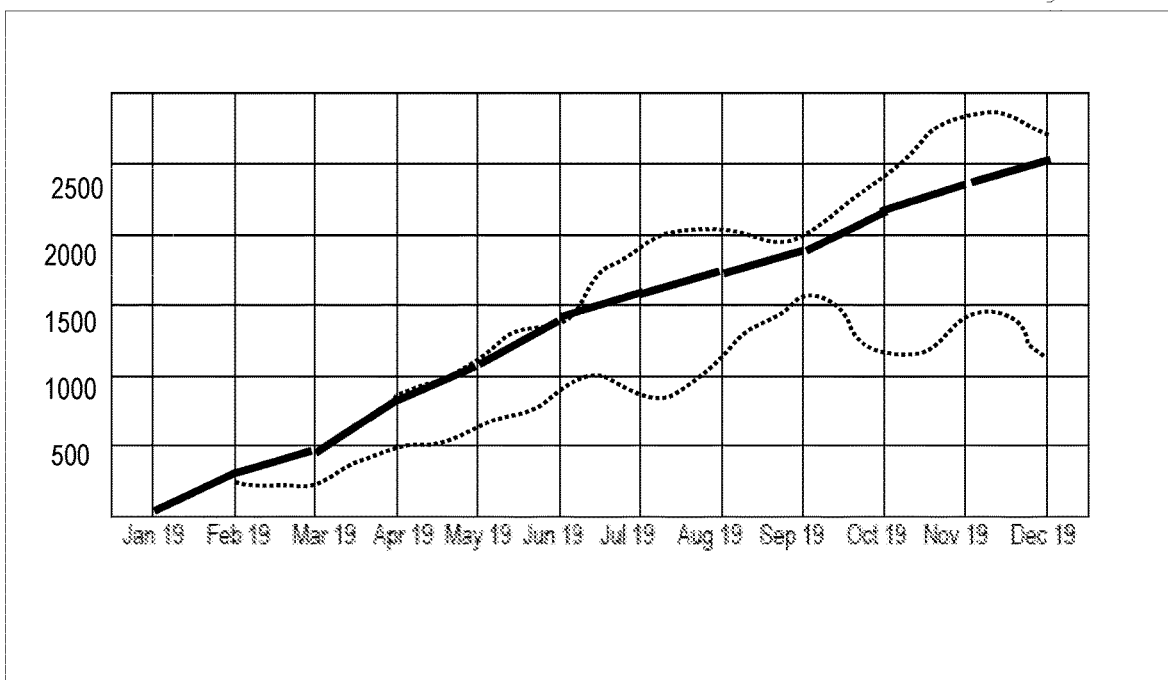
FIG. 3 is a flow diagram illustrating another application of the verbal scale recognition of FIG. 1.

FIG. 1, FIG. 2 and FIG. 3 are utilized to provide an overview of concepts discussed in more detail herein. FIG. 1 is a data flow diagram which inputs different verbal judgment sets and recognizes a numerical scale as a precise numerical interpretation of the verbal judgment sets. FIG. 2 and FIG. 3 are flow diagrams illustrating different applications of such verbal scale recognition.

Reference is now made to FIG. 1, a flow diagram illustrating verbal scale recognition. FIG. 1 illustrates different verbal judgment sets 101A, 101B, 101C, 101D; and a universe of predefined scales 105. Each of the different verbal judgment sets 101A-D includes words which are votes that define different rank values within one of the different verbal judgment sets; the rank value represents an evaluation of an alternative.

It will be appreciated that simple examples are provided herein for illustration. In reality, the data sets are very large and likely will be different data. In this example, the word lists for the first verbal judgment set 101A are "sunflower, high, 100", "current, medium, 500" and "fog, low, 50". The word lists for the second verbal judgment set 101B are "cloud, H, 75", "sapling, M, 355" and "steam, L, 275". The word lists for the third verbal judgment set 101C are "carnivore, important, 16" and "wadi, unimportant, 100". The word lists for the fourth verbal judgment set 101D are "icecap, middle, 400" and "tropics, large, 610". In this example, the universe of predefined scales 105 include the following predefined verbal scales: "high, medium, low", "yes, maybe, no", and "too little, OK as is, too much". In FIG. 1, the numerical column is representative of additional data which may exist, but is unnecessary for the present disclosure. In reality, the universe of predefined scales will be much larger and likely will be different from this example. In embodiments, the universe of predefined scales 105 may be augmented and/or reduced.

One or more or all of the predefined verbal scales in the universe of predefined scales 105 is input 107 as the predefined verbal scales.

The different verbal judgment sets 101A-D, e.g. including categorical votes, is input 103 as data. The different verbal judgment sets 101A-D may be the universe of known data, or may be judgment sets selected from the universe of known data.

Pairs of strings may be input 109, where the pair includes a word of a categorical vote and a word of a predefined scale. Then the system determines 111 a word similarity score of each word of the categorical vote to the predefined scale. For example, the similarity score of each of the words "high", "medium" and "low" of the categorical vote of the first verbal judgment set 101A should reflect perfect similarity to the predefined scale which is input and which includes "high, medium, low"; the similarity score of each of the words "H", "M", and "L" of the categorical vote of the second verbal judgment set 101B to the input predefined scale "high, medium, low" has some similarity. The similarity score of each of the words "middle" and "large" of the set 101D to the same predefined scale has some lower similarity. The similarity score of the words "important" and "unimportant" of the third set 101C will reflect some similarity. It should be noted that the input word may be subjected to a synonym search technique, and the similarity score may be increased due to the synonym. Reliance on a synonym search technique or other data adjustment technique may reduce a confidence factor, if utilized.

Once the similarity score of each word of the categorical vote to the predefined scale is determined, the system can determine 113, for the different verbal judgment sets, a set similarity score of the list of categorical votes and the predefined scale, based on the corresponding similarity scores. In practice, the different verbal judgment sets 101A, 101B, 101C, 101D may each be input individually as a different verbal judgment set, or two or more may be combined and input jointly.

Then, the system will map the words of the different verbal judgment set to a numerical scale. The system will perform a determination that will maximize 115 the similarity across the universe of predefined scales 105 to find the best matching predefined scale to the list of categorical votes. That is, the algorithm can map the given votes to the best match pre-defined scale, and then use the default ordering on the predefined scale to determine the numerical votes. The best matching predefined verbal scale together with the numerical scale is then output 117. This can be regarded as having trained the system on the data 101A-D for the selected predefined scales from the universe of predefined scales 105.

A universe of known data which has different verbal judgment sets is provided. The known data (with the different verbal judgment sets) is then interpreted based on the numerical scale. The predefined verbal scale which is determined to be the best match may then be used for existing data and/or for future data; the predefined verbal scale has a built-in ordering that provides a numerical scale. Note that as additional verbal judgment sets may be provided to retrain the system and confirm or possibly determine a new numerical scale to use.

Note that more than one predefined scale may be determined as the numerical scale to use for the universe of known data.

A simple example of three predefined scales include a first predefined scale which has the votes "Hi, Medium, Low" (a/k/a HML), and a second predefined scale which has the votes "Hi, Low" (a/k/a HL), and a third predefined scale which has the votes "Very Hi, Hi, Medium, Low" (a/k/a/ VH). In this example, "Hi" is a word that exists as an element in the universe of scales. For instance, if there are a set of votes which are High, Hi, Medium, Low, and Lo; and if the universe of predefined scales contains these three predefined scales; the system would match the votes to the HML scale as the best match because each of the votes in the set of votes has an interpretation in that HML scale, and there is no vote in the set of votes that does not exist in the HML scale, and there is no vote in the HML scale that is not used.

In this example, the one of the judgment sets which is "Hi, Medium, Low" it matches the first predefined scale perfectly. A perfect match is not required in embodiments.

Reference is now made to FIG. 2, a flow diagram illustrating an application of the verbal scale recognition of FIG. 1. In this example, the data including different verbal judgment sets 201 includes alternatives (left column) and the words which are votes that define different rank values (middle column). In this example, the data includes revenue or cost (numbers in the right column). The predefined scale in the universe of predefined scales was determined to be "high", "medium", "low". The determination of the predefined scale to use may be made based on previous training, or based on the current input, for example. The data including the categorical votes is input 203 for a precise numerical interpretation. The different rank values in the different verbal judgment sets are interpreted according to the determined predefined scale, and are thus converted to "high", "medium" or "low". For example, "important" and "unimportant" are converted to "high" and "low", respectively; and "middle" and "large" are converted to "high" and "medium". The data is interpreted according to the numerical scale corresponding to the selected predefined scale. The interpreted data can be provided to an application, here represented as a simple pie chart application 205 which inputs the revenue/ cost column as a risk category and which inputs the words in the verbal judgment (each word is a vote) as a "risk" vote reflecting how much risk. The application 205 provides a pie chart of "Cost by True Risk Category".

Reference is now made to FIG. 3, a flow diagram illustrating another application of the verbal scale recognition of FIG. 1. The reference numbers 201 and 203 are the same as in FIG. 2, and the description thereof is accordingly omitted.

In FIG. 3, the interpreted data can be provided to an application, which is a monthly revenue prediction and uncertainty chart application 301 that provides a hurricane plot. Assume that higher uncertainty values affect the revenue, so there is implicit data which is utilized by the uncertainty chart application.

In this example, the input data has synonyms and misspelled versions of High/Medium/Low. Despite the "dirty" aspect of the input data, the system will determine that the "true names" are High/Medium/Low, which in this case are a risk category. Consequently, the spending information (such as 100, 500, etc.) can be associated with a True Risk Category and not be bothered by the misspelling and synonyms. The system knows that High/Medium/Low correspond to numerical values. Since High/Medium/Low are numerical risk scores these are known by the system to correspond to information about probabilities of success and delays. That information is used to generate the hurricane chart of likely Revenue.

FIG. 3 could utilize, for example, a monte carlo simulation based on the cost/revenue numbers, in which the high, medium and low risk cause a distribution of how things will fall; the high, medium, low risk are interpreted for the user. The conventional technique is not able to understand the input data 203 including the categorical votes which have different verbal judgment sets. The conventional system could have input data limiting the user to only "high, medium, low"; however, the conventional system does not handle existing data which might not have been limited to "high, medium, low". Furthermore, the input data 203 has been provided by the users using their unlimited natural word choices; the verbal judgment sets using the users' natural word choices were interpreted based on the numerical scale that corresponds to the predefined scale of "high, medium, low" in the universe of known scales. Without use of the novel interpretation of the different verbal judgment sets, the data that includes different verbal judgment sets is "dirty" and does not provide a useful output from the application 301. The novel interpretation allows the application 301 to make coherent use of "dirty" data. This is an important innovation.

1.1 Terminology and Definitions.

This disclosure relies on some common terminology and definitions. These are provided in FIG. 4A and FIG. 4B (collectively, FIG. 4), and below.

R: The set of all real numbers.

$R^n$ n-dimensional real space.

I: This is the unit interval $[0, 1] \subset R$.

S: The set of all possible character strings, including spaces, etc. We call this set the string space. Some examples of items in S are: "high", "medium", "a low vote", "inférieur".

$S^n$: n-dimensional space of strings. It consists of ordered n-tuples of elements of S.

$S^\infty$: The union of all $S^n$ for n =1, 2, . . . , i.e.

$$S^\infty \triangleq \bigcup_{n=1}^{\infty} S^n$$

$I^\infty$: The union of all $I^n$ for n=1, 2, . . . , i.e.

$$I^\infty \triangleq \bigcup_{n=1}^{\infty} I^n$$

Categorical scale: An ordered list of unique elements of S. These elements are called the levels of the scale. For instance =('hi', 'med', 'lo') is a categorical scale whose levels are 'hi', 'med', and 'lo'. Another way of defining a categorical scale is $S^n$ is a categorical scale iff its components are all different.

|C|: If C is a categorical scale, |C| is the order of C and is defined to be the number of levels in the scale.

(C): If C is a categorical scale, and C=$(c_1, \ldots, c_n)$ then #(C) is the default numerical scale of C and is defined to be:

$$\#(C) = \begin{cases} (1) & \text{if } n = 1 \\ \left(1, \frac{n-2}{n-1}, \frac{n-3}{n-1}, \ldots, \frac{2}{n-1}, \frac{1}{n-1}, 0\right) & \text{otherwise} \end{cases}$$

If $f: A \to \mathbb{R}$ is real valued function, the argmax of $f$ over A is the value of a ∈ A that results in the maximum value of f(a). If there are multiple values of a ∈ A that result in the same maximum value, we choose one. A standard method of resolving ties is to order A=($a_1, a_2, \ldots$) and chose the item with the lowest index.

There must be at least one minimum item if the set A is finite. In our case, the set A is always finite. If A is infinite, there need not be an item of A that minimizes $f$.

This assumes that A can be ordered, which is valid for our use case where A is a finite set. Of course, no matter what A is, the axiom of choice allows us to well order A, although some mathematicians would rather not use that axiom.

1.2 Problem Statement

We want to find a numerical interpretation of categorical votes. There are many ways we could go about defining such a numerical interpretation; however, because of our needs there is a very specific approach we take in this paper. We succinctly state our approach in Problem 1 below. However before that we need a technical explanation of our goal to find a numerical interpretation of categorical votes, which is explained in FIG. 5A, FIG. 5B, and FIG. 5C (collectively, FIG. 5).

Goal 1. Defining a numerical interpretation for any list of categorical votes means we wish to define a function $S^\infty \to I^\infty$.

Problem 1. Our approach to this problem consists of two main pieces, one depending upon the other:

1. Define a collection of predefined scales, which we denote by:

$$\vec{C} = (C_1, \ldots C_n)$$

2. Define a function $F: S^\infty \to \vec{C}$ that associates to any list of votes $\vec{v} \in S^\infty$:

(a) a predefined scale $F(\vec{v})$ (b) and a mapping of the elements of $\vec{v}$ to the levels in the scale $F(\vec{v})$.

(c) and a confidence score (a number between 0 and 1) for that mapping of the votes $\vec{v}$ to the predefined scale $F(\vec{v})$.

Note 1. That confidence score is really a mapping $f: S^\infty \to I$ that associates to any list of votes $\vec{v}$ the confidence $f(\vec{v})$ that the predefined scale $F(\vec{v})$ is a good match to the votes $\vec{v}$.

FIG. 5A provides Goal 1. FIG. 5B provides Problem 1, i.e., an approach to the problem including two main pieces, each depending upon the other. FIG. 5C provides Note 1 to the Problem Statement.

1.3 Why not use sentiment analysis?

There is another approach to this problem that seems more direct and adaptable than that of Problem 1, namely sentiment analysis. The approach using sentiment analysis would be the following.

Problem 2 (Sentiment analysis approach). Define a mapping $Q: S \to I$ that gives the numerical value of any word. We use that mapping to create our desired mapping $S^\infty \to I^\infty$ that scores any list of categorical votes.

The sentiment analysis approach is defined in FIG. 6 (Problem 2).

There are two main problems with the sentiment analysis approach though:

1. There is no obvious way to derive a confidence score from the individual sentiment analysis scores. This is a minor problem, though, compared to . . .

2. The value of words is dependent upon the other words around it, and this methodology completely misses that subtlety. For example:

(a) With votes ('hi', 'low', 'low') 'low' is the lowest and 'hi' is the best. They would get default numerical scale values of 1 and 0 respectively. However, with votes ('very hi', 'hi', 'medium', 'very low', 'low') the standard numerical scale values of all of the votes would be ('very hi', 'hi', 'medium', 'very low', 'low') → (1, 3/4, 1/2, 1/4, 0) meaning 'hi' has a value of 3/4 and 'low' has a value of 1/4. There is no way to duplicate this behavior using the sentiment analysis approach.

(b) With votes of ('medium risk', 'very low risk'), it would appear that we have only 2 levels. However, it is obvious to a human looking at that data that those are obviously a part of scale ranging from 'very hi' to 'very low', and that the numerical values of 'medium risk' and 'very low risk' should have an extra gap between them (where 'low risk' would sit). A sentiment analysis approach could somewhat cover this case, but at the expense of understanding the hi/med/low are a scale by themselves.

1.4 Tools Used

Tool chains used in a representative implementation of this system may include Jupyter and Python, along with PyCharm community edition for the Python IDE, as well as git for downloading any source code. An easy way to get Python with machine learning and scientific libraries installed is to install anaconda. Jupyter is a locally running server accessed via a web browser. Jupyter may be conveniently run with the jupyter—notebook command. PyCharm, for example the community edition, may be conveniently used as an IDE by the manufacturers of IntelliJ. Other embodiments may be one or more of these, or other, tools.

1.5 Discussion of kNN Algorithm

The kNN algorithm is a convenient example of a machine learning algorithm, which is simple, that uses known training data to predict results on new data. Other machine learning algorithms may be used in embodiments. The kNN algorithm predicts results on new data by finding the k nearest known data points and using the known results of those k nearest neighbors to predict the new data point's value.

The natural question is: how do we define 'nearest'? We do this by assuming we have measurements we can take on our data points, i.e. functions $f_i$ for $i=1, \ldots, n$ that map our data points into the real numbers R. These functions are called features. Using all of our features $f_1, \ldots, f_n$ we have a map from our data points into $R^n$ (n-dimensional real space), and we can use any of the standard metrics (or pseudo metrics) we like to measure distance in $R^n$. The standard metric is the Euclidean metric, but others can be used.

Now that we know what 'nearest' means, the next question is: what are we trying to predict? There are two types of predictions the kNN algorithm typically takes: categorical and continuous. Most kNN applications handle the categorical (or discrete) case. In that case, our data points have a label associated with them (e.g. Good/Bad), and our training data has those labels for each point. In this case the kNN algorithm looks at the k nearest neighbors and counts the number of occurrences of each labeling among the neighbors. Whichever labeling occurs most frequently is the labeling our new data point gets.

However, we are interested in predicting continuous data based on the learning data set, in this example we can use the kNN algorithm to predict continuous data. Our application of the kNN algorithm is to solve the problem, Problem 3, better shown in FIG. 7.

Problem 3 (kNN usage). Given two words $w_1, w_2 \in S$ calculate a similarity score for those words. The similarity score should be a real number between 0 and 1, where 0 means completely dissimilar and 1 means identical. In function notation, we wish to define a function:

$$\text{sim}: S \times S \to I$$

Our features are different measurements of how similar a pair of words are: conventional techniques may be used, for instance, Hamming distance, or Levenshtein distance, or the like.

In other embodiments, neural networks (for example, tensor flow) may be used instead of kNN for learning overall word similarities.

2. Concept

Recall that this algorithm is trying to define a numerical interpretation to any list of categorical votes, i.e. to achieve Goal 1. We use the approach of Problem 1 which we can paraphrase as:

1 Create a finite collection of predefined scales, which we denote by $C_1, \ldots, C_\varphi$.
2. Construct a function that finds the best fit predefined scale for any list of categorical votes, along with a confidence score for that matching.

Finite collections of predefined scales are widely available and readily created. Lists of categorical votes (as an example of different verbal judgment sets) exist and can be created by known software, for example, Decision Lens ANP and others. The magic, so to speak, to quickly interpret the different verbal judgment sets so that the data becomes high quality, easily usable and understandable to computer applications, is in step 2. We outline the steps of that part of the approach in the following section.

2.1 Outline of the Approach

To find the best predefined scale that fits a list of categorical votes $\vec{v}(v_1, \ldots, v_n)$, we use the steps in Table 1 (better shown in FIG. 9), which can be more concisely stated as in Table 2 (herein).

2.2 Word Similarity Score Calculation Using kNN

This concept involves the word similarity scoring described in step 1 of Table 1 (better shown in FIG. 9) and Table 2 herein. The solution to this was previously mentioned in Problem 3 (better shown in FIG. 7). We solve this by following the steps of Table 3 (better shown in FIG. 10).

Regarding Table 3, FIG. 8 better shows a Note 2:

Note 2. In Table 3 we need only define the $f_1, \ldots, f_m$ word pair features and the training data set $\vec{w}_1, \ldots, \vec{w}_N$. The remainder is the standard kNN algorithm applied to that data.

TABLE 1

Technical Details of Steps (see also FIG. 9).

| | |
|---|---|
| 1. | Create a function: sim : $S \times S \to I$ that inputs pairs of strings and outputs their "similarity score", for example, a score between 0 (meaning completely dissimilar) to 1 (meaning completely similar). (This is a difficult part of the process.) One of skill wil lappreciate that other scores could be adapted to work. |
| 2. | Given a predefined scale $C = (c_1, \ldots, c_k)$:<br>(a) for each vote $v_i \in v$ calculate how well vi matches the scale C by calculating: $\widetilde{\text{sim}}(v_i, C) = $ similarity of $v_i$ to |

TABLE 1-continued

Technical Details of Steps (see also FIG. 9).

| | |
|---|---|
| | $C \triangleq \max_{j=1,\ldots,k} \{sim(v_i, c_j)\}$<br>In other words, we find the best matching word in C to match the word $v_i$, and call that score the similarity score of $v_i$ to C. |
| 3. | The previous step gives us a list of n similarity scores for $\vec{v} = (v_1, \ldots, v_n)$ to the predefined scale C. We combine those scores together using an $L^p$ norm, normally denoted by $\|\ \|_p$ and defined to be:<br>$$\|(x_1, \ldots, x_m)\|_p \triangleq \sqrt[p]{\sum_{i=1}^m |x_i|^p}$$<br>And we define our p-similarity of $\vec{v}$ to C to be:<br>$\widetilde{\text{sim}}_p(\vec{v}, C) \triangleq \|(\widetilde{\text{sim}}(v_1, C), \ldots, \widetilde{\text{sim}}(v_n, C))\|_p$ |
| 4. | Lastly we look across all predefined scales $C_i$ to find the one with the largest p-similarity score and define that to be the best match, and that score to be the matching score. |

TABLE 2

Concise Version of Table 1

| | |
|---|---|
| 1. | Create a similarity function for pairs of words. |
| 2. | Use that similarity function to calculate similarity of a word to a predefined scale. |
| 3. | Use that similarity function to calculate a similarity score for a list of votes to a predefined scale. |
| 4. | Maximize that function across all predefined scales to find the best matching predefined scale to a list of votes. |

TABLE 3

Word pair similarity score with kNN

| | |
|---|---|
| 1. | Define simple to calculate word pair similarity scores, aka features in machine learning parlance. We call those $f_1, \ldots,$ fm that are maps $S^2 \to I$. |
| 2. | Have a training set of word pairs $\vec{w}_1, \ldots \vec{w}_N$ $\in S^2$ that each have a similarity score $s_1, \ldots, s_N$. |
| 3. | Then we have a table of data such as the following:<br><br>training<br>| similarity score | $f_1$ | $\ldots$ | $f_m$ |<br>\|---\|---\|---\|---\|<br>\| $\vec{w}_1$ | $s_1$ | $f_1(\vec{w}_1)$ | $\ldots$ | $f_m(\vec{w}_1)$ \|<br>\| $\vec{w}_2$ | $s_2$ | $f_1(\vec{w}_2)$ | $\ldots$ | $f_m(\vec{w}_2)$ \|<br>\| $\ldots$ | $\ldots$ | $\ldots$ | $\ldots$ | $\ldots$ \|<br>\| $\vec{w}_N$ | $s_N$ | $f_1(\vec{w}_N)$ | $\ldots$ | $f_m(\vec{w}_N)$ \| |
| 4. | We train a kNN algorithm against this data. |
| 5. | We may use k = 5 as the default value, which is used as an example herein; note that this value may be changed in other embodiments. |
| 6. | We may use the standard Euclidean distance for kNN, which is used as an example herein; note that this may be changed in other embodiments. |
| 7. | The training data $\vec{w}_1$ may be stored in a file for future use. |

2.3 Word Similarity Features

The word similarity features $f_1, f_m: S^2 \to I$ are functions that are relatively simple to describe that measure an aspect of word similarity. In an example embodiment we have the following word pair similarity features.

Note 3. We can normalize all strings before applying word similarity functions to them, these steps include, currently:

convert to all lower case strip spaces at the beginning and end of the string convert spaces between to words in the string into a single space Also see Note 4 (better shown in FIG. 11).

Note 4 (Vote versus level in $S^2$). Our features are functions $S^2 \to I$. The first coordinate we call the vote and the second coordinate we call the level. For our application a vote is one element of a list of votes we are comparing to predefined scales. Whereas the level is a single element in a predefined scale. In other words, when we use these functions, we put the vote in the first coordinate and the level of the predefined scale we are testing against in the second coordinate.

Determinations of distances and similarity in general are known. The following features may be implemented and applied to the votes using the techniques as explained in the following.

substring_similarity: Returns one if the vote string is a substring of level. If the vote is not an exact substring, check if the vote characters are distributed sequentially throughout level. Assign a weight based on the ratio of matching vote letters sequentially distributed in level and the string length of level. Essentially, there is a check for how close vote is to being a substring of level.

Levenshtein distance: Uses the Levenshtein distance as defined in Levenshtien's standard text on "Levenshtein Distance: Information Theory, Computer Science, String (Computer Science), String Metric, Damerau? Levenshtein Distance, Spell Checker, Hamming Distance (Alpha Press, 2009). An embodiment may use a modification of Levenshtein distance where deletions cost very little (0.1) whereas insertions and replacements cost 1. Essentially it behaves similar to a substring like score.

longest common substring: Calculates the longest common subsequence of characters in the pair and divides by the length of the larger string.

hamming distance: Calculates the standard hamming distance if both strings have the same length. If the vote is shorter, we repeat the characters of the vote over and again until we match the length of the level string. Otherwise we trim the level string to match the length of the vote string. After that distance is calculated, we divide by the length of the strings and then subtract that number from 1 (to turn it into a similarity score).

jaro similarity: Uses the Jaro similarity score as discussed by way of example in Cohen, Ravikumar, and Fienberg, "A comparison of string distance metrics for name matching tasks", in "Proceedings of IJCAI-03 Workshop on Information Integration, pages 73-78 (ed. Knoblock and Kambhampati, August 2003).

2.4 Tokenization

Comparing words without tokenizing may be problematic. For instance, most measurements would consider the word 'risk high' to be fairly different from 'high risk'. Yet we know those strings to be very similar, because we can tokenize and compare them token by token.

Our approach is to allow each word similarity feature in Section 2.3 to have an argument called "tokenize" that, if true, follows the algorithm show in Table 4 (FIG. 14, illustrating Table 4: $L^P$-tokenization). Tokenization of words in general is a known technique.

TABLE 4

$L^P$-tokenization algorithm

| | |
|---|---|
| 1. | Normalizes the vote and level strings |
| 2. | Tokenize on space characters |

TABLE 4-continued $L^P$-tokenization algorithm

| | |
|---|---|
| 3. | Breaks the vote string up into tokens $v_1, \ldots, v_n$ and tokenizes the level string into tokens $\ell_1, \ldots, \ell_q$ |
| 4. | For $i = 1, \ldots, n$ (we loop over vote tokens), and let $\vec{\ell}$ be the level tokens. |
| | (a) Find the $\ell_j \in \vec{\ell}$ with the maximum string similarity score to $v_i$ (for this string similarity feature we are defining, i.e. it is recursive). |
| | (b) Call that $\ell_j$ the best match for $v_i$ and record that score in the vector $\vec{s}$. |
| | (c) Remove $\ell_j$ from $\vec{\ell}$ so that we do not match the same level token to multiple vote tokens. |
| | (d) Break if the length of $\vec{\ell}$ is zero. |
| 5. | Take the $L^P$ norm of $\vec{s}$ (which is length $m = \min(n, q)$) and divide by the $L^P$ norm of $\vec{1_m} = (1, \ldots, 1)$ m-times. In other words: $$\frac{\|\vec{s}\|_p}{\|\vec{1_m}\|_p}$$ |

Consider the ML training data for word pair similarity illustrated in Table 5.

TABLE 5

ML training data for word pair similarity score

| Vote | Level | Similarity out of 10 |
|---|---|---|
| low | low | 10 |
| lo | low | 9 |
| l | low | 9 |
| love | low | 0 |
| random | low | 0 |
| lwo | low | 8 |
| willingly | helplesslly | 0 |
| shortly available | taco bell food | 0 |
| lowly | low | 9 |

2.5 Maximum Likelihood (ML) Word Similarity Score

We want to use the word features defined in Section 2.3, using the tokenization idea of the previous section, and create a kNN model to learn general word similarity. Alternatives to kNN may be used for learning overall word similarities, such as neural networks. This process was outlined in Table 3 (FIG. 10). We have defined the $f_i$ features from Table 3 (FIG. 10), now we need the training data. A more complete list of training data may be developed based on the disclosure herein. A small but representative sampling of data is included in Table 5 herein.

Reference is made to Definition 1 of a sim function, illustrated in FIG. 12A.

Definition 1 (sim function). We use kNN with regression on the training data, using the features $f_1, \ldots, f_5$ defined in Section 2.3 to define our ML word pair similarity score function, which we denote by $\mathrm{sim}:S^2 \to I$.

2.6 Votes→Scale Similarity Score

We may use the word pair similarity function of Definition 1 to create a votes to predefined scale similarity function. These are steps 2 and 3 from Table 2. For emphasis we include that table again in Table 6, indicating the unneeded steps for comparison to Table 2.

We calculate step 2, the word to predefined scale similarity by the formula illustrated in FIG. 12B:

$$\mathrm{sim}'(v, C) = \text{vote } v \text{ to scale } C \text{ similarity} = \max_{c_i \in C}(\mathfrak{Sim}(v, \mathfrak{C}_i))$$

With sim' defined, we can construct a best fit score for a sequence of votes to a predefined scale.

FIG. 13 provides an illustration of Definition 2.

Definition 2 (Votes to scale similarity vector:sim). Given $\vec{v}=(v_1,\ldots,v_m)$ a vector of votes and a predefined scale C, we define the votes to similarity vector to be:

$$\text{sim}(\vec{v}, C) \triangleq (\text{sim}(v_1, C), \ldots, \text{sim}(v_m, C))$$

Note 5. In other words, we have the vector of similarity scores of each $v_i$ to C.

Reference is made to Definition 3 (Vote matches a scale), illustrated in FIG. 15.

Definition 3 (Vote matches a scale). Given a number $\alpha \in I$ and a vote $v_i$ we say that $v_i$ matches a scale C to level $\alpha$ iff sim' $(v_i, C) \geq \alpha$.

TABLE 6

Votes → Scale similarity score 1. (Unnecessary) Create a similarity function for pairs of words.
2. Use that similarity function to calculate similarity of a word to a predefined scale.
3. Use the similarity function to calculate a similarity score for a list of votes to a predefined scale.
4. (Unnecessary) Maximize that function across all predefined scales to find the best matching predefined scale to a list of votes.

Reference is made here to FIG. 16, which provides Definition 4 (Votes→scale similarity score sim).

Definition 4 (Votes → scale similarity score sim). Let $\alpha \in I$ and p be a positive real number. We calculate the p-similarity score for a vector of votes $\vec{v}$ to a predefined scale C by calculating several statistical measurements on sim $(\vec{v}, C)$. Those statistical measurements are:

The mean of the vector sim $(\vec{v}, C)$, which we denote by m.

The mean of the elements of the vector sim $(\vec{v}, C)$ that match the scale to a level $\alpha$. We denote this by m'.
The percent of votes that matched to level $\alpha$. We denote this by $p_v$.
The percent of levels of C that are used. We denote this by $p_c$.
We then calculate the weighted Lp norm of those statistical measurements, i.e., $$\overline{\text{sim}}(\vec{v}, C) \triangleq \frac{\sqrt[p]{(w_1 m)^p + (w_2 m')^p + (w_3 p_v)^p + (w_4 p_c)^p}}{\sqrt[p]{w_1^p + w_2^p + w_3^p + w_4^p}}$$

Note: since sim has parameters p, $\alpha$, and the weights $\vec{w} = (w_1, w_2, w_3, w_4)$ we should really use the notation:

$$\overline{\text{sim}}_{\alpha,p,\vec{w}}(\vec{v}, C)$$

However, when those parameters are clear from context we can suppress them in the notation.

In embodiments, instead of taking a weighted $L^p$ norm of statistical scores to combine the word similarities into votes→scale similarity score, kNN may be used, and/or neural networks may be used.

2.7 Matching votes to best fit scale

We can use our votes to similarity score function sim from Definition 4 to find the best fit, predefined scale. Recall, from the beginning of this section, we have a list of predefined scales:

$$C_1, \ldots, C_\varphi$$

Our goal is to find the best fit scale to our list of votes $\vec{v}$. We already have the function sim that gives us a matching score for $\vec{v}$ to any $C_i$. We can use that function to then find the predefined scale $C_i$ with the best matching score. We need only have one more parameter, to describe the minimum matching score we want, in order to call the match good enough.

Reference is made here to FIG. 17, which provides Definition 5 (Best predefined scale matching $\vec{v}$).

Definition 5 (Best predefined scale matching $\vec{v}$). Given a list of predefined scales $\vec{C}=(C_1,\ldots,C_\varphi)$ and a vector of votes $\vec{v}$ the best match score of $\vec{v}$ to $\vec{C}$ is defined to be:

$$\text{match}_{\alpha,p,\vec{w}}(\vec{v}, \vec{C}) \triangleq \max\{\overline{\text{sim}}_{\alpha,p,\vec{w}}(\vec{v}, C_1), \ldots, \overline{\text{sim}}_{\alpha,p,\vec{w}}(\vec{v}, C_p)\}$$

In other words, if the matching score is under the threshold $\beta$ we say that there is no best match, otherwise the best match is the $C_i$ that maximizes the similarity score. If there is a tie, we may choose any $C_i$ as the best match, such as the first $C_i$ in the list.

Note 6. See Section 1.1 for a definition of the argmax function, referenced in Definition 5.

2.8 The Predefined Scale List

The algorithm described in Definition 5 requires a list of predefined scales. It may be convenient to store the data in a spreadsheet, or other appropriate database. It may be convenient to have a spreadsheet with one sheet per number of elements in the scales. A first sheet titled '3pt' may look like Table 3PT:

TABLE 3Pt

| ScalePt1 | ScalePt2 | ScalePt3 |
|---|---|---|
| Too little | OK as is | Too much |
| Ineffective | Uncertain | Effective |
| Not useful | Some impact | Useful |
| Will not do it | Undecided | Will do it |
| Definitely not | Undecided | Definitely will |
| Not essential | Makes no difference | Imperative |
| No | Maybe | Yes |
| Not at all | Very little | Some |
| Very hard | Neither hard nor easy | Hard |
| No | Somewhat | Yes |
| bad | okay | good |

3 Reference Implementation 3.1 Tools

The tools which may be used to run a Python reference implementation are discussed by way of example in Section 1.4

3.2 Structure and running unit tests in PyCharm

The following provides a very simple example illustration in Table 7 (example word feature scores) which applies the above-discussed substring similarity (substr), levenshtein distance (lev), longest common substring (lcss), hamming distance (hamm), and jaro similarity (jaro) techniques. One or a combination of two or more of these techniques, or other similarity and/or distance techniques may be used in implementations. In actual operation, a very large number of votes are expected.

TABLE 7

Example word feature scores

| Vote | Level | substr | lev | lcss | hamm | jaro |
|---|---|---|---|---|---|---|
| 0 | media | medium | 0.666667 | 0.741667 | 0.666667 | 0.666667 | 0.7921 |

TABLE 7-continued

Example word feature scores

| Vote | Level | substr | lev | lcss | hamm | jaro |
|---|---|---|---|---|---|---|
| 1 m | medium | 1.000000 | 0.541667 | 0.166667 | 0.166667 | 0.5625 |
| 2 love | low | 0.500000 | 0.612500 | 0.500000 | 0.500000 | 0.6084 |
| 3 hat | high | 0.250000 | 0.362500 | 0.250000 | 0.250000 | 0.3249 |

4.0 Example Calculations 4.1 Maximum Likelihood (ML) Word similarity score

Maximum likelihood makes a known likelihood distribution (reflected by the word feature scores in Table 7) a maximum. For this example we also have the following ML word similarity score as defined in Section 2.5, collected in Table 8.

TABLE 8

Example ML similarity scores

| Vote | Level | ML Similarity Score |
|---|---|---|
| 0 media | medium | 0.86 |
| 1 m | medium | 0.86 |
| 2 love | low | 0.68 |
| 3 hat | high | 0.18 |

4.2 Vote→scale similarity scores

This is the calculation defined in section 2.6. Votes are collected to scale similarity scores for the votes given in the previous examples against the standard HML scale, which is the scale with the levels:

$C_{HML}$=('high', 'medium', 'low')

TABLE 9

Vote → scale similarity score examples

| Vote | Scale Similarity to $C_{HML}$ |
|---|---|
| 0 media | 0.86 |
| 1 m | 0.86 |
| 2 love | 0.68 |
| 3 hat | 0.18 |

4.3 Votes best fit scale calculation

Recall from Section 2.7 Definition 5, the best fit scale may be found by calculating sim from Definition 4 again the predefined scales and picking the maximum. Thus, finding the best fit scale may really boil down to calculating sim. Table 10 shows the sim scores for the given votes (the rows) against the given predefined scales (the columns) where those scales are:

$C_{HML}$=('high', 'medium', 'low')
$C_{GOB}$=('good', 'okay', 'bad')
$C_{VHML}$=('very high', 'high', 'medium', 'low', 'very low')

TABLE 10 sim score used for best fit scale

| Votes | $C_{HML}$ | $C_{GOB}$ | $C_{VHML}$ |
|---|---|---|---|
| ('medal', 'hit', 'log') | 0.897687 | 0.000637 | 0.768709 |
| ('very h', 'very lo') | 0.000955 | 0.004774 | 0.805869 |
| ('vh', 'm', 'l', 'vl') | 0.681249 | 0.000000 | 0.602368 |

5. Conclusions

As examples of matching, consider the following possibilities:

('hi', 'med', 'l', 'very hi')→('very high', 'high', 'medium', 'low', 'very low')

('gd', 'ok', 'b', 'go')→('good', 'okay', 'bad')

('gd', 'fa', 'poor', 'gd')→('poor', 'fair', 'good', 'very good')

('gd', 'fa', 'poor', 'go') might be matched to ('poor', 'fair', 'good', 'very good'); note that "go" may be interpreted as "very good".

('h', 'm', 'v hi') might be matched to ('not at all', 'very little', 'some') which is incorrect V. Additional Example Implementation(s)

Figure 19:
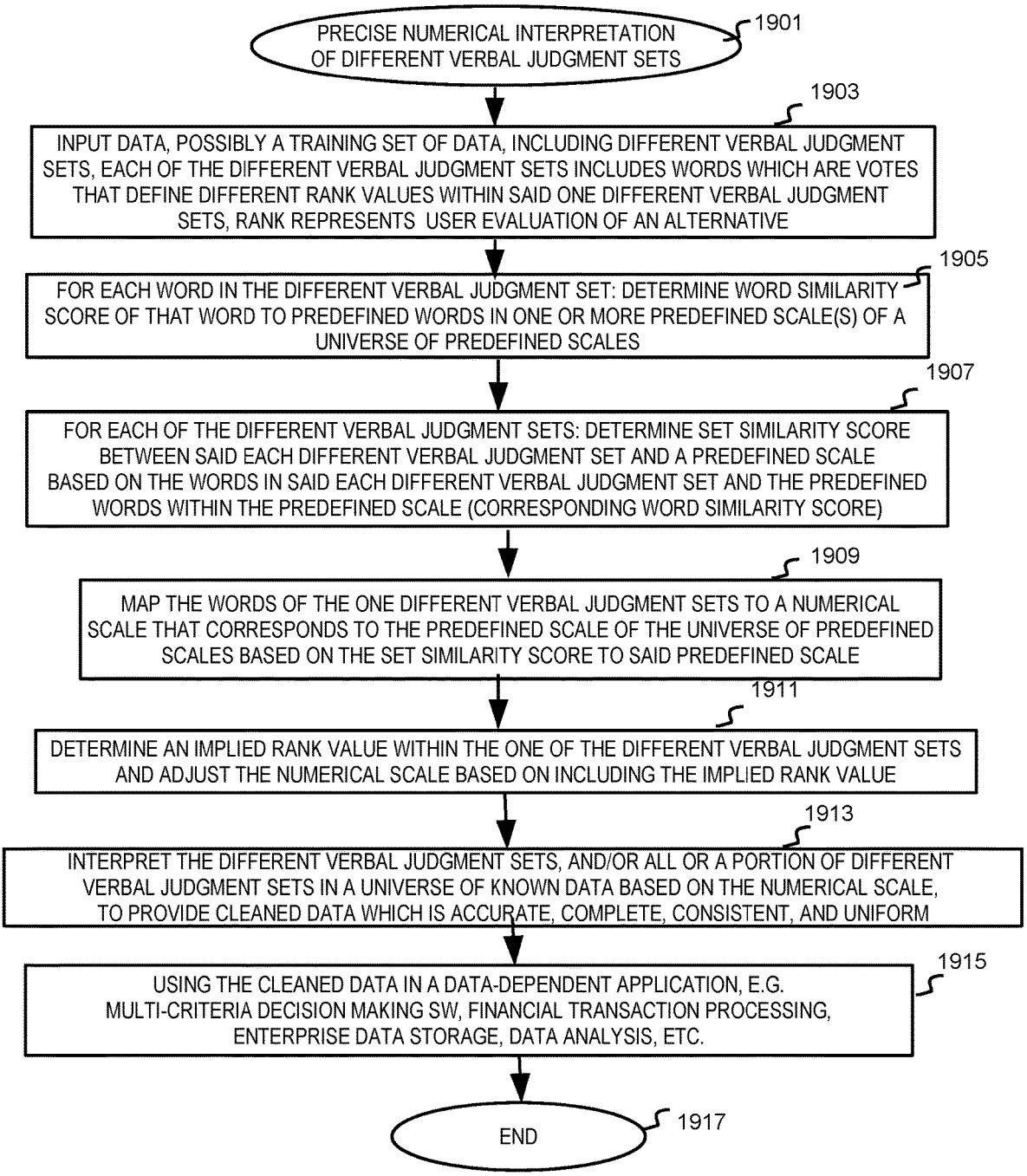
FIG. 19 is a flow chart illustrating a procedure for precise numerical interpretation of different verbal judgment sets.
Figure 20:
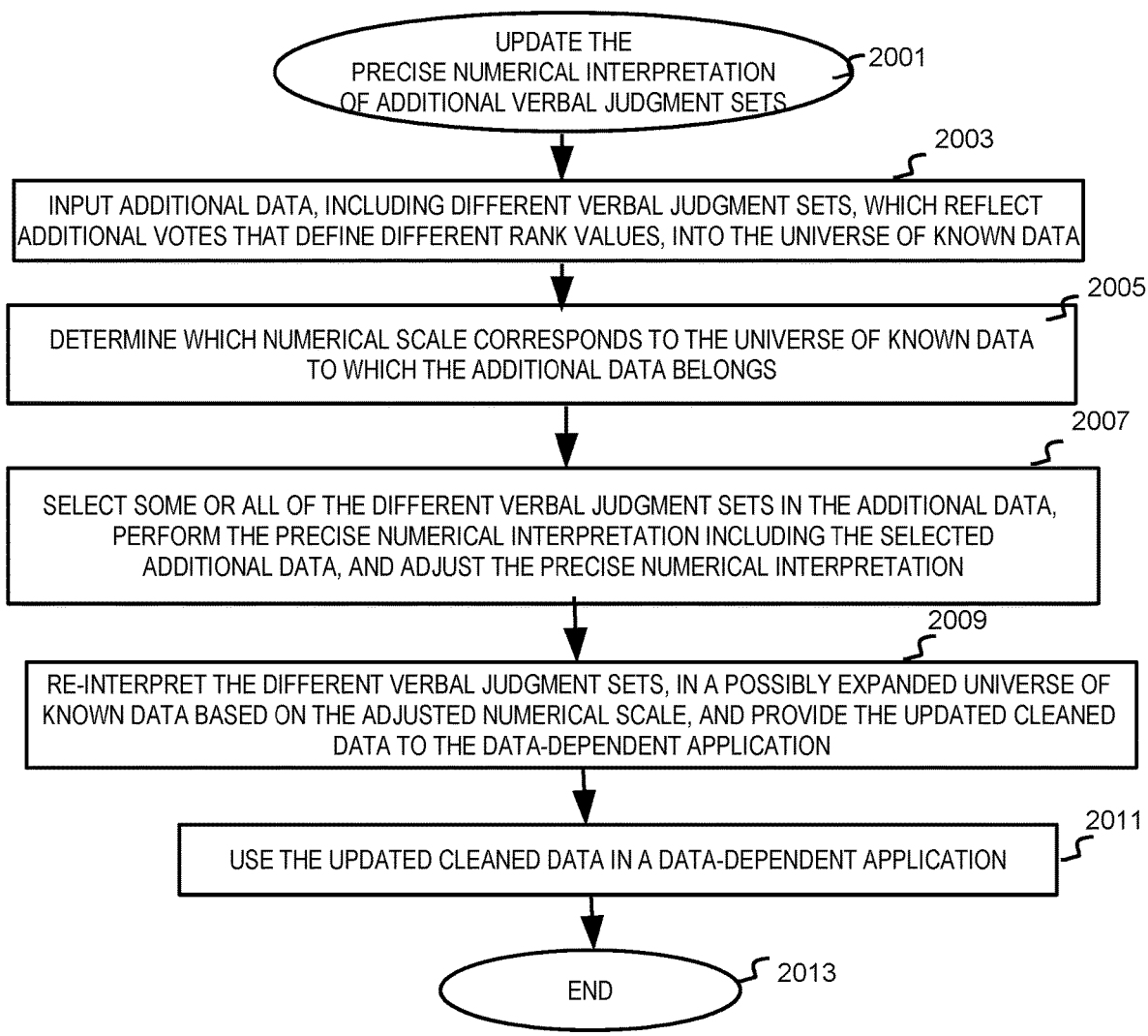
FIG. 20 is a flow chart illustrating a procedure to update the precise numerical interpretation of additional verbal judgment sets.

This section will discuss additional concrete examples of implementations. First discussed is FIG. 18 which is a block diagram illustrating portions of a computer for precise numerical interpretation of different verbal judgment sets. Next discussed are the flow charts of FIG. 19 to FIG. 21 addressing different parts of data life cycle; these flow charts may be implemented as instructions executed on an appropriate computer such as that illustrated in FIG. 18. FIG. 19 is a flow chart illustrating a procedure for precise numerical interpretation of different verbal judgment sets. FIG. 20 is a flow chart illustrating a procedure to update the precise numerical interpretation of additional verbal judgment sets, assuming that additional data may be provided on which is developed a better numerical interpretation. FIG. 21 is a flow chart illustrating a procedure to perform precise numerical interpretation of additional different verbal judgment sets, assuming that the numerical scale for the universe of known data has already been prepared.

Figure 18:
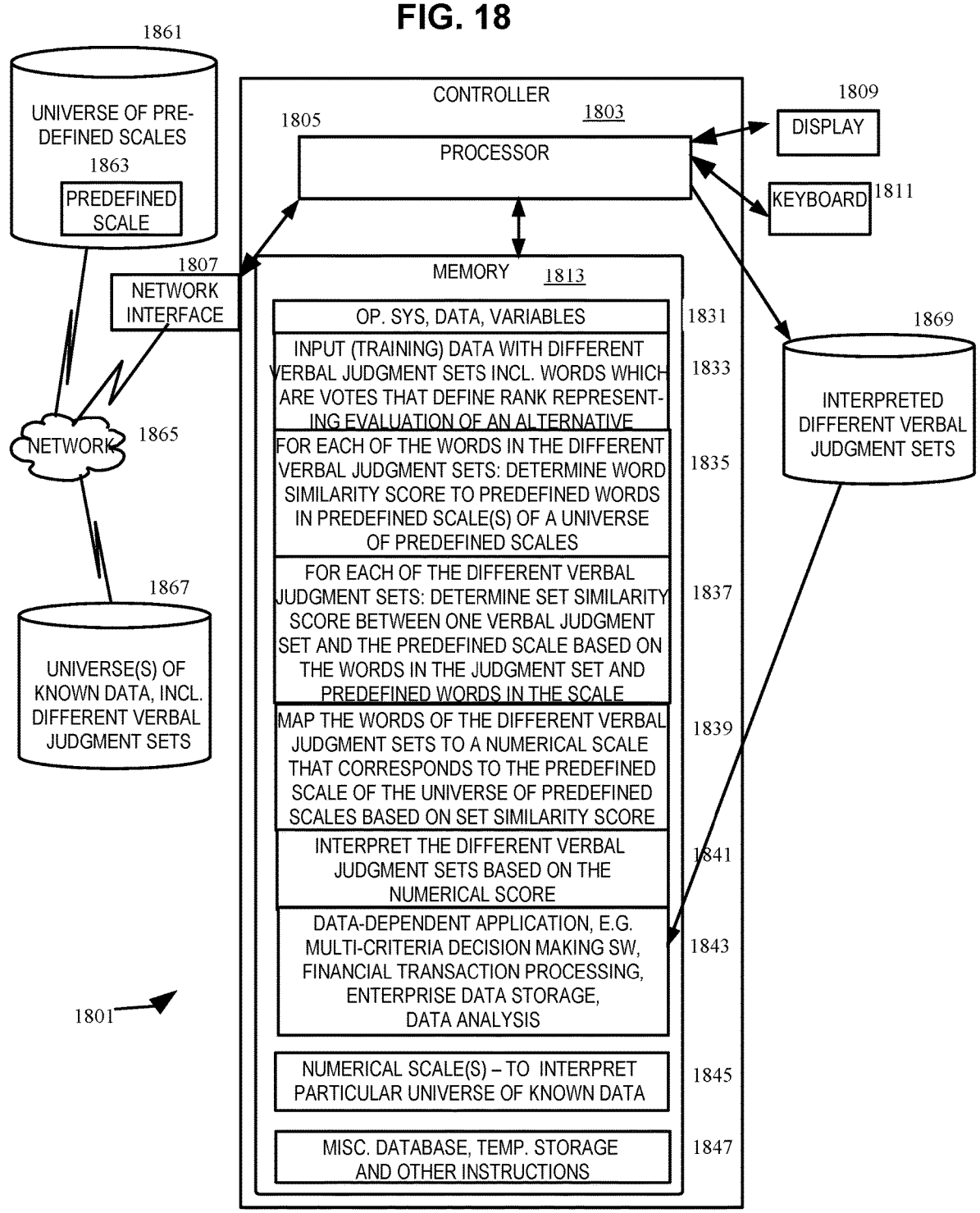
FIG. 18 is a block diagram illustrating portions of a computer.

FIG. 18 is a block diagram illustrating portions of a computer, used in one or more embodiments. The computer 1801 may include one or more controllers 1803, a processor 1805, a memory 1813, and other peripherals or features such as a network interface 1807 for communication over a network 1865, a display 1809, and/or a user input device such as represented here by a keyboard 1811.

The processor 1805 may comprise one or more microprocessors and/or one or more digital signal processors. The memory 1813 may be coupled to the processor 1805 and may comprise a read-only memory (ROM), a random-access memory (RAM), a programmable ROM (PROM), and/or an electrically erasable read-only memory (EEPROM). The memory 1813 may include multiple memory locations for storing, among other things, an operating system, data and variables 1831 for programs executed by the processor 1805; and computer programs for causing the processor to operate in connection with various functions such as a data-dependent application 1843, by way of example without limitation, a multi-criteria decision making software application, financial transaction processing application, enterprise data storage application, data analysis software, and/or database system. The computer programs may be stored, for example, in ROM or PROM and may direct the processor 1805 in controlling the operation of the computer 1801.

The user may invoke functions accessible through the user input device 1811. The user input device 1811 may comprise one or more of various known input devices, such as a keypad, a computer mouse, a touchpad, a touch screen, a trackball, and/or a keyboard. Responsive to signaling from the user input device 1811, in accordance with instructions stored in memory 1813, or automatically upon receipt of certain information via the network interface 1807, the processor 1805 may direct the stored information or received information. The display 1809 may present information to the user by way of a conventional liquid crystal display (LCD) or other visual display, and/or by way of a conventional audible device (e.g., a speaker, not illustrated) for playing out audible messages. Portions of the computer 1801 are well understood to those of skill in this area and have been omitted to avoid obscuring the discussion.

The processor 1805 may comprise one or more microprocessors and/or one or more digital signal processors. The memory 1813 may include multiple memory locations for storing, among other things, computer programs for causing the processor to operate in connection with various functions such as inputting 1833 different verbal judgment sets; determining 1835 word similarity scores for words in the different verbal judgment sets in relation to predefined words in predefined scales of a universe of predefined scales; determining 1837 set similarity scores between one verbal judgment set and the predefined scale based on the words in the one verbal judgment set and the predefined words in the predefined scale; mapping 1839 the words of the different verbal judgment sets to a numerical scale that corresponds to the predefined scale determined based on the set similarity score; interpreting 1841 the different verbal judgment sets in the universe of known data based on the numerical score; storage 1845 of precise numerical scale(s) which have been determined for use with a particular universe of known data that includes different verbal judgment sets; and a database 1847 and temporary storage for other information and other instructions used by the processor 1805. The computer programs may be stored, for example, in ROM or PROM and may direct the processor 1805 in controlling the operation of the computer 1801.

The computer 1801 is included in a computer system which may provide access to a universe 1861 of pre-defined scales, and one or more universe(s) 1867 of known data, including different verbal judgment sets. The computer system also is programmed with the data-dependent application 1843 which requires cleaned data so that it can provide accurate results, as opposed to the known data which may provide inaccurate results or may not even provide results.

The computer 1801 may access a storage that stores a universe 1861 of pre-defined scales, include one or more individual predefined scales 1863. The discussion herein has provided several examples of a predefined scale, which includes word rankings, e.g., "hi", "medium", "low" and many others which will be understood from this simple example.

The computer 1801 may access a storage that stores at least one universe 1867 of known data, wherein the known data includes at least different verbal judgment sets. Typically a verbal judgment set includes at least an alternative that is evaluated and a word which is a vote that defines a rank value that represents a user's judgment as to that alternative. Herein, the user may utilize user-selected words, which need not be pre-defined (i.e., may be typed in or orally dictated, or others), or which may have been chose from pre-defined scales (but scales for different verbal judgment sets might be different). The above has discussed different ways in which the data might be regarded as "dirty" or needing to be cleaned especially so that it may be used accurately, or to allow use in the first place, by a data-dependent application. It will be appreciated that the computer 1801 may support plural universe(s) of known data, such as when a particular universe of known data is collected and owned by one company or collected and owned by a particular research project. It is understood by those of skill in the art that the amount of data provide in the universe 1867 of known data is extremely large, and the operations to be performed on the universe of known are too complex and cannot be reasonably expected to be performed by a human.

In the illustrated embodiment, the storage of the universe 1861 of pre-defined scales and the universe(s) (1867) of known data are accessed by the computer 1801 via a network interface 1807 over a network 1865. It will be understood that one or more of the storages 1861, 1867 may be provided locally, and/or remotely, and/or may be distributed.

The processor 1805 may be programmed to input 1833 data with different verbal judgment sets, wherein each of the judgment sets includes words, wherein each word is a vote that defines a rank representing an evaluation of an alternative, wherein there are different alternatives reflected in the judgment set. It is expected that a verbal judgment set pairs each alternative of a plurality of different alternatives with a vote. It is noted that the input data may be some or all of the universe of known data 1867; in some embodiments training data is selected from the universe of known data 1867.

The processor 1805 may be programmed to determine 1835, for each of the words in the different verbal judgment sets, word similarity scores in relation to predefined words in one or more predefined scale(s) 1863 of a universe of predefined scales 1861. This is discussed in more detail elsewhere herein.

The processor 1805 may be programmed to determine 1837, for each of the different verbal judgment sets in the input data, a set similarity score between one verbal judgment set and the predefined scale based on the words in the one verbal judgment set and the predefined words in the predefined scale. This is discussed in more detail elsewhere herein.

The processor 1805 may be programmed to determine which predefined scale of the universe of predefined scales corresponds to the different verbal judgment sets. The processor 1805 will map 1839 the words of the different verbal judgment sets to a numerical scale that corresponds to the predefined scale of the universe of predefined scales which is determined based on the set similarity score, as further discussed elsewhere herein. The processor 1805 may utilize a best fit to select the predefined scale. This is discussed in more detail elsewhere herein.

The processor 1805 may be programmed to interpret 1841 the different verbal judgment sets in the universe of known data based on the numerical score, which will result in cleansed data, as is also discussed elsewhere herein. The cleansed data may be provided to the data-dependent application 1843.

It should be understood that FIG. 18 is described in connection with logical groupings of functions or resources. One or more of these logical groupings may be performed by different components from one or more embodiments. Likewise, functions may be grouped differently, combined, or augmented without parting from the scope. Similarly, the present description may describe various databases or collections of data and information. One or more groupings of the data or information may be omitted, distributed, combined, or augmented, or provided locally and/or remotely without departing from the scope. For example, it will be appreciated that the present system may be incorporated into and provided as part of a data-dependent application which pre-processes data; or as another example, the present system may be provided as a tool to clean data for other applications, or to prepare cleaned data for storage in a database.

The computer 1801 can accommodate one or more disk drives or removable storage (not illustrated). Typically, these might be one or more of the following: a flash memory, a hard disk drive, a CD ROM, a digital video disk, an optical disk, and/or a removable storage device such as a USB memory stick, variations and evolutions thereof. The number and type of drives and removable storage may vary with different configurations. Disk drives may be interconnected by a bus along with other peripheral devices supported by the bus structure (not illustrated); a disk controller (not illustrated) can interface disk drives to the bus and to the processor 1805; disk drives may be internal or external; memory may be located in a cloud storage. One or more of the processor 1805, memory 1813, and optionally a disk drive and/or removable storage medium provide non-transitory storage of computer programs and data.

The flow charts FIG. 19 to FIG. 21 are now described. The procedures discussed herein can advantageously be implemented as instructions which are programmed and/or executed on, for example, a processor of a computer, described in connection with FIG. 18 or other apparatus appropriately arranged.

FIG. 19 is a flow chart illustrating a procedure 1901 for precise numerical interpretation of different verbal judgment sets. The procedure includes inputting 1903 data with the different verbal judgment sets; determining 1905 a word similarity score for each word in each of the different verbal judgment sets to predefined words in one or more predefined scale(s); determining 1907 a set similarity score between the different verbal judgment set and the predefined scale based on the words in the verbal judgment set and the words within the predefined scale; mapping 1909 the words of the different verbal judgment set to a numerical scale that corresponds to the predefined scale based on the set similarity score to said predefined scale; in some embodiments, determining 1911 an implied rank value within the verbal judgment sets and adjusting the numerical scale based on including the implied rank value; interpreting 1913 at least some of the different verbal judgment sets in the universe of known data based on the numerical scale, to provide cleaned data which is accurate, complete, consistent, and uniform (in some embodiments with a confidence measure); and using 1915 the cleaned data in a data-dependent application. These are discussed in more detail below, although details may be omitted which are discussed elsewhere.

The procedure 1901 includes inputting 1903 data with a plurality of different verbal judgment sets. Each of the different verbal judgment sets includes words, and each of the words is a vote that defines a different rank value within the different verbal judgment sets. A rank value represents an evaluation of an alternative ("alternative" is understood in, for example, a pairwise comparison). An example of a rank value is "high" or "unimportant". An example of a pairwise comparison is "carnivore, important" and "wadi, unimportant" where the alternatives are "carnivore" and "wadi" which are ranked against each other. The data may be selected from or all of a universe of known data, which may be extremely large. The data may be provided at this stage as training data based upon which the numerical scale will be developed. The data may be selected for training using known techniques, such as most recent data, or distributed data, by way of example without limitation. The data which is included with the plurality of different verbal judgment sets may include other data, such as suggested by FIG. 1 to FIG. 3 which also include cost or revenue data associated with each word and its vote. It may be useful to maintain the raw data in the universe of known data without being cleaned, and string a copy of the cleaned data for actual use by a data-dependent application. The data which are input at this stage may be used as training data for determining 1905 the word similarity score, determining 1907 the set similarity score, and mapping 1909 to the corresponding numerical scale, determining 1911 the implied rank value and adjusting the numerical scale.

The procedure 1901 includes determining 1905, for each word in the different verbal judgment set: a word similarity score for that word in the different verbal judgment set to predefined words in one or more predefined scale(s) of a universe of predefined scales. An example of a predefined scale is "very hi", "hi", "medium", "low", and "very low"; another pre-defined scale may be "hi", "medium" and "low". Details for determining a word similarity score for a word compared to predefined words in a predefined scale are discussed elsewhere herein.

The procedure 1901 includes determining 1907, for the different verbal judgment sets, a set similarity score between the one of the different verbal judgment sets and the predefined scale based on the words included the verbal judgment set and the words within the predefined scale. This has been discussed elsewhere in detail.

The procedure 1901 includes mapping 1909 the words of the different verbal judgment set to a numerical scale that corresponds to the predefined scale based on the set similarity score to said predefined scale. This is also discussed elsewhere herein. The numerical scale can be stored by the procedure as corresponding to the universe of known data, so that subsequent uses of that particular universe of known data can determine and use the numerical scale which was developed for that universe of known data.

The procedure 1901 includes, in some embodiments, determining 1911 one or more implied rank value(s) within the verbal judgment sets and adjusting the numerical scale based on including the implied rank value. A verbal judgment set is not necessarily a complete listing of all possible rank values. A particular verbal judgment set may imply that other rank values were omitted. For example, a verbal judgment set of "high" and "low" may imply that a rank value as an internal step internal to the list, i.e., "medium", was omitted. As another example, a verbal judgment set of "low" "medium" "high" and "very high" implies that the scale has a concept as to degree of rank; specifically the existence of "very" infers that "very low" should exist to symmetrically balance "very high". As an example, a verbal judgment set consisting of "very low" and "high" is determined to have missing internal steps, and a missing concept; the verbal judgment set including the implied rank values is "very low", "low", "medium", "high" and "very high".

The procedure 1901 includes interpreting 1913 at least some of the different verbal judgment sets in the universe of known data based on the numerical scale, to provide cleaned data which is accurate, complete, consistent, and uniform (in some embodiments with a confidence measure). This is discussed elsewhere herein. Preferably the procedure retains both the universe of known data (which is not cleaned) and the cleaned data, which is ready to provide to a data-dependent application; it is a prudent practice to retain the original data at least for the reason that the understanding of the original data may become more complete as data is added to the universe of known data from time-to-time. It will be appreciated that the procedure may be used to ingest large existing databases that have the different verbal judgment sets (as the universe of known data) so that the existing data may be prepared for use with data-dependent applications. Without such preparation, the existing data may be unusable for the desired data-dependent applications, or the existing data may result in error-prone outcomes.

The procedure 1901 includes using 1915 the cleaned data in a data-dependent application, such as multi-criteria decision making software (perhaps the Decision Lens ANP software), financial transaction processing, enterprise data storage, data analysis, or the like. The cleaned data will be provided in the form as specified by the data-dependent application; by way of a simple example, some such applications expect the data to be provided in a spreadsheet.

The procedure 1901 may end 1917 after interpreting the different verbal judgment sets, or after providing the cleaned data for further use, or after using the cleaned data in the data-dependent application.

FIG. 20 and FIG. 21 are provided to illustrate, by way of example, additional lifecycle uses of the precise numerical interpretation of verbal judgment sets. Verbal judgment sets may be expanded from time-to-time, or data may be edited or deleted therein. Accordingly, it may be desirable to update the precise numerical interpretation.

FIG. 20 is a flow chart illustrating a procedure 2001 to update the precise numerical interpretation of additional verbal judgment sets. The procedure 2001 may include inputting 2003 additional data, including different verbal judgment sets, which reflect additional votes that define different rank values, into the universe of known data. For example, consider that one of the additional, new, verbal judgment sets include the rank values never before present of "very high" and "very low". This may cause a different numerical interpretation of the different verbal judgment sets in the universe of known data.

The procedure 2001 may include determining 2005 which numerical scale corresponds to the universe of known data to which the additional data belongs. The procedure 2001 may include selecting 2007 some or all of the different verbal judgment sets in the additional data, performing the precise numerical interpretation based on the different verbal judgment sets which include the selected additional data, and adjusting the precise numerical interpretation accordingly. The procedure 2001 may include re-interpreting the different verbal judgment sets, in a possibly expanded or revised universe of known data based on the adjusted numerical scale, and providing the updated cleaned data to any data-dependent application. Then, the data-dependent application will use 2011 the updated cleaned data, and a possibly different result may be achieved corresponding to the same universe of known data which now has an adjusted numerical scale. The procedure 2001 may end 2013 after interpreting the different verbal judgment sets, or after providing the cleaned data for further use, or after using the cleaned data in the data-dependent application.

FIG. 21 is a flow chart illustrating a procedure 2101 to perform precise numerical interpretation of additional different verbal judgment sets. This procedure assumes that additional data is to be processed using an already-determined numerical interpretation. The procedure 2101 may include inputting 2103 additional data, including different verbal judgment sets, which reflect additional votes that define different rank values, into the universe of known data. As a concrete example, one or more perhaps new users can input words (for example, a set of votes which are Important, Large, Hi, Medium, Low, Good and Bad) which are additional votes on alternatives. The procedure 2101 will include determining 2105 which numerical scale corresponds to the universe of known data to which the additional data belongs. For example, the computer system may have stored a table which associates or indexes a particular universe of known data to a particular numerical scale which has already been determined (such as by the procedure of FIG. 19). In the concrete example, the already-determined numerical scale may be "Hi, Medium, Lo". The procedure 2101 includes interpreting 2109 the different verbal judgments sets in the universe of known data, which includes the additional data, based on the numerical scale which is determined to be associated with that universe of known data, to provide cleaned data including additional cleaned data corresponding to the additional data in the universe of known data. In the concrete example, the additional votes (Important, Large, Hi, Medium, Low, Good and Bad) are interpreted to be Hi, Hi, Hi, Medium, Low, Hi, and Low. Then, the data-dependent application will use 2111 the cleaned data which includes the additional clean data, and a possibly different result may be achieved corresponding to the now-expanded universe of known data using the previously-determined numerical scale. In the concrete example, the data-dependent application has 4 additional votes for "Hi", two additional votes for "Low", and one additional vote for "Medium"; the data-dependent application will update its results based on the additional clean data. The procedure 2101 may end 2013 after interpreting the different verbal judgment sets, or after providing the cleaned data for further use, or after using the cleaned data in the data-dependent application.

VI. Lexicon

Terms as used herein are intended to be interpreted first, as understood to one of skill in the art at a first level, preferably of AHP/ANP (analytic hierarchy process/analytic network process) and next of Machine Learning (ML) if not interpretable according to AHP/ANP; and if not interpretable at the first level, then at a second level as understood to one of skill in the art of computer science; and then if not interpretable according to the first level and second level, according to a more general dictionary.

The claims may use the following terms. Examples may be provided below to illustrate the definition. Other definitions may be specified in this document.

Under AHP/ANP

Alternative: An item that is to be evaluated.

Criterion: A dimension to evaluate alternatives on. For instance, we could evaluate a list of cars on the Style criterion. Another example is evaluating a list of houses on the Cost criterion.

Vote: A single value for the evaluation of a single alternative on a single criterion.

Judgment Set: A collection of votes of a list of projects on a single criterion.

Verbal Judgment Set: A judgment set whose values are words. For instance, evaluating cars on Cost, we may have values like High, Medium, and Low.

Vote Set: See judgment set.

Verbal Scale: The list of possible values we could have for a verbal judgment set combined with their numerical values. For instance, evaluating cars on Cost, with values High, Medium, and Low, the scale could be the list of, for example, (Low=0.1, Medium=0.5, High=1).

Scale: See verbal scale. Also, one of skill may use "scale" to mean a numeric scale for a criterion votes; however this document uses scale to mean verbal scale.

Predefined Scale: A verbal scale that is pre-defined, that can be thought of as part of a universe of known scales.

Universe of Predefined Scales: A list of predefined scales, wherein the universe has been pre-defined.

Under Machine Learning

Instance: An item to be evaluated. See alternative in the AHP definitions.

Feature: This term has 2 related senses:
1. A dimension to evaluate instances on. See criterion in the AHP definitions.
2. A collection of the values of a list of instances on a single feature (using "feature" in the first sense definition). See judgment set in the AHP definitions.

Value: A single value for the evaluation of an instance on a feature.

Categorical Feature: A feature whose values are words from a finite set of possibilities. For instance, evaluating cars on Cost, we may have values like High, Medium, and Low. See verbal judgment set from the AHP definitions.

Ordinal Scale: The list of possible outputs we could have for a categorical feature, and whose words also have a numerical scale attached to them. See verbal scale in the AHP definitions. For instance, evaluating car instances on the Cost feature, with values High, Medium, and Low, the ordinal scale would be the list (Low=0.1, Medium=0.5, High=1). See verbal scale in the AHP definitions.

Categorical Scale: We tend to abuse notation and use this as synonymous with ordinal scale. However there are 2 types of categorical scales: ordinal and nominal. Ordinal we have already defined, and a nominal categorical scale is simply an ordinal scale without the numerical interpretation.

Predefined (Ordinal) Scale: An ordinal scale that we have defined already, and can be thought of as an element of the universe of known ordinal scales. Note: we abuse notation and replace 'ordinal' with 'categorical' sometimes, and sometimes suppress it altogether and call it a 'predefined scale'.

Universe of Known (Ordinal) Scales: A list of already known ordinal scales. We sometimes either suppress the word 'ordinal' and call this the 'universe of known scales', or replace the 'ordinal' with 'categorical'.

Universe of Predefined (Ordinal) Scales: See universe of known (ordinal scales).

Others

The term "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof.

The phrase "automatically without manual intervention," when used in a claim, is defined to mean that the particular step occurs after the step is initiated until limitations recited in the step are finished without requiring a user to provide input to a processor.

VII. Implementation Notes and Technical Notes

The above discussion has assumed that the reader has a sufficient technical background for appreciating the points made. This section provides some supplementary implementation and/or technical notes which discuss some technical information that may be relevant.

This discussion has involved particular examples. However, the principles may be applied to other examples and/or realizations. Naturally, the relevant data may differ, as appropriate.

Further, an embodiment has been discussed in certain examples as if it is made available by a provider to a single customer with a single site. An embodiment may be used by numerous users, if preferred, for example over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for verbal scale recognition, numerical interpretation of verbal judgment sets, and/or data cleansing have been discussed in detail above. It should be further noted that the above-described processes can be stored as instructions in computer-readable storage medium. When the instructions are executed by a computer, for example after being loaded from a computer-readable storage medium, the process(es) are performed.

The detailed descriptions which appear above may be presented in terms of program procedures executed on a computer or network of computers. These procedural descriptions and representations herein are the means used by those skilled in the art to most effectively convey the substance of their work to others skilled in the art.

The system used in connection with the invention may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the present invention contemplates the use of an operator to access the invention, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will appear from the description given herein.

Furthermore, the communication networks of interest include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system comprising:
at least one processor configured to:
input data including a plurality of different verbal judgment sets, wherein each one of the different verbal judgment sets includes words which are votes that define different rank values within the one of the different verbal judgment sets, wherein a rank value represents an evaluation of an alternative;
for each word of the words in the different verbal judgment sets:
determine a word similarity score of the word to predefined words in at least one predefined scale of a universe of predefined scales;
for the different verbal judgment sets:
determine a set similarity score between the one of the different verbal judgment sets and the at least one predefined scale based on the word similarity scores of the words included in the one of the different verbal judgment sets and the predefined words within the at least one predefined scale;
map the words of the one of the different verbal judgment sets to a numerical scale that corresponds to the at least one predefined scale of the universe of predefined scales, based on the set similarity score to the at least one predefined scale; and
interpret the different verbal judgment sets in a universe of known data based on the numerical scale and provide the interpreted different verbal judgment sets corresponding to the plurality of different verbal judgment sets.

2. The computer system of claim 1, wherein the processor is further configured to
determine an implied rank value within the one of the different verbal judgment sets; and
adjust the numerical scale based on the one of the different verbal judgment sets including the implied rank value.

3. The computer system of claim 1, wherein the processor is further configured to
receive additional data including the different verbal judgment sets,
determine a respective matching score between the at least one predefined scale and the different verbal judgment sets in the additional data,
when a perfect matching score is determined, update the numerical scale based on the predefined scale and the different verbal judgment sets with the perfect matching score.

4. The computer system of claim 1, wherein the processor is further configured to
generate a confidence score that indicates how the different verbal judgment sets match the numerical scale.

5. The computer system of claim 1, wherein the input data is based on actual votes in a decision system, wherein the processor is further configured to interpret the actual votes using the numerical scale.

6. The computer system of claim 1, wherein the processor is further configured to infer a missing step as an additional rank value into the one of the different verbal judgment sets.

7. The computer system of claim 1, wherein the processor is further configured to infer a missing concept as an additional rank value into the one of the different verbal judgment sets.

8. A method for recognizing a numerical scale as a precise numerical interpretation of a plurality of different verbal judgment sets, the method comprising:
inputting data including the plurality of different verbal judgment sets, wherein each one of the different verbal judgment sets includes words which are votes that define different rank values within the one of the different verbal judgment sets, wherein a rank value represents an evaluation of an alternative;
for each word of the words in the different verbal judgment sets:

determining a word similarity score of the word in the one of the different verbal judgment sets to predefined words in at least one predefined scale of a universe of predefined scales;

for the different verbal judgment sets:
  determining a set similarity score between the one of the different verbal judgment sets and the at least one predefined scale based on the word similarity scores of the words included in the one of the different verbal judgment sets and the predefined words within the at least one predefined scale;
  mapping the words of the one of the different verbal judgment sets to a numerical scale that corresponds to the at least one predefined scale of the universe of predefined scales, based on the set similarity score to the at least one predefined scale; and
  interpreting the different verbal judgment sets in a universe of known data based on the numerical scale and provide the interpreted different verbal judgment sets corresponding to the plurality of different verbal judgment sets.

9. The method of claim 8, further comprising
determining an implied rank value within the one of the different verbal judgment sets; and
adjusting the numerical scale based on the one of the different verbal judgment sets including the implied rank value.

10. The method of claim 8, further comprising
receiving additional data including the different verbal judgment sets,
determining a respective matching score between the at least one predefined scale and the different verbal judgment sets in the additional data,
when a perfect matching score is determined, updating the numerical scale based on the predefined scale and the different verbal judgment sets with the perfect matching score.

11. The method of claim 8, further comprising
generating a confidence score that indicates how the different verbal judgment sets match the numerical scale.

12. The method of claim 8, wherein the input data is based on actual votes in a decision system, wherein the actual votes are interpreted using the numerical scale.

13. The method of claim 8, further comprising inferring a missing step as an additional rank value into the one of the different verbal judgment sets.

14. The method of claim 8, further comprising inferring a missing concept as an additional rank value into the one of the different verbal judgment sets.

15. A non-transitory computer-readable medium comprising instructions for execution by a computer, the instructions including a computer-implemented method for recognizing a numerical scale as a precise numerical interpretation of a plurality of different verbal judgment sets, the instructions for implementing:
  inputting data including the plurality of different verbal judgment sets, wherein each one of the different verbal judgment sets includes words which are votes that define different rank values within the one of the different verbal judgment sets, wherein a rank value represents an evaluation of an alternative;
  for each word of the words in the different verbal judgment sets:
    determining a word similarity score of the word in the one of the different verbal judgment sets to predefined words in at least one predefined scale of a universe of predefined scales;
  for the different verbal judgment sets:
    determining a set similarity score between the one of the different verbal judgment sets and the at least one predefined scale based on the word similarity scores of the words included in the one of the different verbal judgment sets and the predefined words within the at least one predefined scale;
    mapping the words of the one of the different verbal judgment sets to a numerical scale that corresponds to the at least one predefined scale of the universe of predefined scales, based on the set similarity score to the at least one predefined scale; and
    interpreting the different verbal judgment sets in a universe of known data based on the numerical scale and providing the interpreted different verbal judgment sets corresponding to the plurality of different verbal judgment sets.

16. The non-transitory computer-readable medium of claim 15, further comprising
determining an implied rank value within the one of the different verbal judgment sets; and
adjusting the numerical scale based on the one of the different verbal judgment sets including the implied rank value.

17. The non-transitory computer-readable medium of claim 15, further comprising
receiving additional data including the different verbal judgment sets,
determining a respective matching score between the at least one predefined scale and the different verbal judgment sets in the additional data,
when a perfect matching score is determined, updating the numerical scale based on the predefined scale and the different verbal judgment sets with the perfect matching score.

18. The non-transitory computer-readable medium of claim 15, further comprising
generating a confidence score that indicates how the different verbal judgment sets match the numerical scale.

19. The non-transitory computer-readable medium of claim 15, wherein the input data is based on actual votes in a decision system, wherein the actual votes are interpreted using the numerical scale.

20. The non-transitory computer-readable medium of claim 15, further comprising inferring a missing step as an additional rank value into the one of the different verbal judgment sets.

21. The non-transitory computer-readable medium of claim 15, further comprising inferring a missing concept as an additional rank value into the one of the different verbal judgment sets.

* * * * *